US012095187B2

(12) United States Patent
Lu

(10) Patent No.: US 12,095,187 B2
(45) Date of Patent: Sep. 17, 2024

(54) ROBUST, MINIATURIZED CARD EDGE CONNECTOR

(71) Applicant: Amphenol East Asia Ltd., Taoyuan (TW)

(72) Inventor: Lo-Wen Lu, Taoyuan (TW)

(73) Assignee: Amphenol East Asia Ltd., Taoyuan (TW)

(*) Notice: Subject to any disclaimer, the term of this patent is extended or adjusted under 35 U.S.C. 154(b) by 20 days.

(21) Appl. No.: 17/856,507

(22) Filed: Jul. 1, 2022

(65) Prior Publication Data

US 2022/0336980 A1 Oct. 20, 2022

Related U.S. Application Data

(63) Continuation of application No. 16/721,594, filed on Dec. 19, 2019, now Pat. No. 11,381,015.

(60) Provisional application No. 62/783,336, filed on Dec. 21, 2018.

(51) Int. Cl.
*H01R 12/72* (2011.01)
*H01R 13/6581* (2011.01)

(52) U.S. Cl.
CPC ....... *H01R 12/721* (2013.01); *H01R 13/6581* (2013.01)

(58) Field of Classification Search
CPC .............. H01R 13/631; H01R 13/6581; H01R 12/721; H01R 24/60; H01R 13/6335; H01R 12/725; H01R 12/7005; H01R 13/6582; H01R 13/6594
See application file for complete search history.

(56) References Cited

U.S. PATENT DOCUMENTS

| | | | |
|---|---|---|---|
| 2,996,710 A | 8/1961 | Pratt |
| 3,002,162 A | 9/1961 | Garstang |
| 3,134,950 A | 5/1964 | Cook |
| 3,322,885 A | 5/1967 | May et al. |

(Continued)

FOREIGN PATENT DOCUMENTS

| | | |
|---|---|---|
| CN | 1175101 A | 3/1998 |
| CN | 1192068 A | 9/1998 |

(Continued)

OTHER PUBLICATIONS

Chinese communication for Chinese Application No. 201580014851.4, dated Jun. 1, 2020.

(Continued)

*Primary Examiner* — Renee S Luebke
*Assistant Examiner* — Paul D Baillargeon
(74) *Attorney, Agent, or Firm* — Wolf, Greenfield & Sacks, P.C.

(57) ABSTRACT

A receptacle connector with a metal housing encircling an insulative housing with a slot to receive a paddle card of a plug connector. The metal housing may have a tab engaging a wall of the insulative housing bounding the slot. The tab may be positioned such that, if a plug is improperly inserted into the receptacle, it presses against the tab. The tab may be configured to distribute force generated during an attempt to mate a misaligned plug away from thin wall portions of the insulative housing at an end of the slot. The tab may extend over a surface of the insulative housing beyond that thin wall portion and may be recessed into the housing.

25 Claims, 6 Drawing Sheets

(56) References Cited

U.S. PATENT DOCUMENTS

| | | | |
|---|---|---|---|
| 3,530,422 | A | 9/1970 | Goodman |
| 3,631,381 | A | 12/1971 | Pittman |
| 3,786,372 | A | 1/1974 | Epis et al. |
| 3,825,874 | A | 7/1974 | Peverill |
| 3,863,181 | A | 1/1975 | Glance et al. |
| 3,977,757 | A | 8/1976 | Yurtin |
| 4,155,613 | A | 5/1979 | Brandeau |
| 4,195,272 | A | 3/1980 | Boutros |
| 4,276,523 | A | 6/1981 | Boutros et al. |
| 4,286,837 | A | 9/1981 | Yasutake et al. |
| 4,371,742 | A | 2/1983 | Manly |
| 4,408,255 | A | 10/1983 | Adkins |
| 4,447,105 | A | 5/1984 | Ruehl |
| 4,471,015 | A | 9/1984 | Ebneth et al. |
| 4,484,159 | A | 11/1984 | Whitley |
| 4,490,283 | A | 12/1984 | Kleiner |
| 4,518,651 | A | 5/1985 | Wolfe, Jr. |
| 4,519,664 | A | 5/1985 | Tillotson |
| 4,519,665 | A | 5/1985 | Althouse et al. |
| 4,632,476 | A | 12/1986 | Schell |
| 4,636,752 | A | 1/1987 | Saito |
| 4,682,129 | A | 7/1987 | Bakermans et al. |
| 4,687,267 | A | 8/1987 | Header et al. |
| 4,728,762 | A | 3/1988 | Roth et al. |
| 4,751,479 | A | 6/1988 | Parr |
| 4,761,147 | A | 8/1988 | Gauthier |
| 4,787,548 | A | 11/1988 | Abbagnaro et al. |
| 4,806,107 | A | 2/1989 | Arnold et al. |
| 4,846,724 | A | 7/1989 | Sasaki et al. |
| 4,846,727 | A | 7/1989 | Glover et al. |
| 4,871,316 | A | 10/1989 | Herrell et al. |
| 4,878,155 | A | 10/1989 | Conley |
| 4,948,922 | A | 8/1990 | Varadan et al. |
| 4,970,354 | A | 11/1990 | Iwasa et al. |
| 4,975,084 | A | 12/1990 | Fedder et al. |
| 4,992,060 | A | 2/1991 | Meyer |
| 5,000,700 | A | 3/1991 | Masubuchi et al. |
| 5,041,023 | A | 8/1991 | Lytle |
| 5,066,236 | A | 11/1991 | Broeksteeg |
| 5,141,454 | A | 8/1992 | Garrett et al. |
| 5,150,086 | A | 9/1992 | Ito |
| 5,166,527 | A | 11/1992 | Solymar |
| 5,168,252 | A | 12/1992 | Naito |
| 5,168,432 | A | 12/1992 | Murphy et al. |
| 5,171,161 | A | 12/1992 | Kachlic |
| 5,176,538 | A | 1/1993 | Hansell, III et al. |
| 5,266,055 | A | 11/1993 | Naito et al. |
| 5,280,257 | A | 1/1994 | Cravens et al. |
| 5,287,076 | A | 2/1994 | Johnescu et al. |
| 5,334,050 | A | 8/1994 | Andrews |
| 5,340,334 | A | 8/1994 | Nguyen |
| 5,346,410 | A | 9/1994 | Moore, Jr. |
| 5,429,520 | A | 7/1995 | Morlion et al. |
| 5,429,521 | A | 7/1995 | Morlion et al. |
| 5,433,617 | A | 7/1995 | Morlion et al. |
| 5,433,618 | A | 7/1995 | Morlion et al. |
| 5,456,619 | A | 10/1995 | Belopolsky et al. |
| 5,461,392 | A | 10/1995 | Mott et al. |
| 5,474,472 | A | 12/1995 | Niwa et al. |
| 5,484,310 | A | 1/1996 | McNamara et al. |
| 5,496,183 | A | 3/1996 | Soes et al. |
| 5,499,935 | A | 3/1996 | Powell |
| 5,551,893 | A | 9/1996 | Johnson |
| 5,562,497 | A | 10/1996 | Yagi et al. |
| 5,597,328 | A | 1/1997 | Mouissie |
| 5,651,702 | A | 7/1997 | Hanning et al. |
| 5,669,789 | A | 9/1997 | Law |
| 5,796,323 | A | 8/1998 | Uchikoba et al. |
| 5,831,491 | A | 11/1998 | Buer et al. |
| 5,885,088 | A | 3/1999 | Brennan et al. |
| 5,924,899 | A | 7/1999 | Paagman |
| 5,981,869 | A | 11/1999 | Kroger |
| 5,982,253 | A | 11/1999 | Perrin et al. |
| 5,993,259 | A | 11/1999 | Stokoe et al. |
| 6,019,616 | A | 2/2000 | Yagi et al. |
| 6,152,747 | A | 11/2000 | McNamara |
| 6,168,469 | B1 | 1/2001 | Lu |
| 6,174,202 | B1 | 1/2001 | Mitra |
| 6,174,203 | B1 | 1/2001 | Asao |
| 6,174,944 | B1 | 1/2001 | Chiba et al. |
| 6,217,372 | B1 | 4/2001 | Reed |
| 6,293,827 | B1 | 9/2001 | Stokoe |
| 6,296,491 | B1 | 10/2001 | Pickles |
| 6,296,496 | B1 | 10/2001 | Trammel |
| 6,299,438 | B1 | 10/2001 | Sahagian et al. |
| 6,299,483 | B1 | 10/2001 | Cohen et al. |
| 6,315,615 | B1 | 11/2001 | Raistrick |
| 6,322,395 | B1 | 11/2001 | Nishio et al. |
| 6,328,601 | B1 | 12/2001 | Yip et al. |
| 6,347,962 | B1 | 2/2002 | Kline |
| 6,350,134 | B1 | 2/2002 | Fogg et al. |
| 6,361,363 | B1 | 3/2002 | Hwang |
| 6,364,711 | B1 | 4/2002 | Berg et al. |
| 6,375,510 | B2 | 4/2002 | Asao |
| 6,379,188 | B1 | 4/2002 | Cohen et al. |
| 6,394,842 | B1 | 5/2002 | Sakurai et al. |
| 6,398,588 | B1 | 6/2002 | Bickford |
| 6,409,543 | B1 | 6/2002 | Astbury, Jr. et al. |
| 6,447,170 | B1 | 9/2002 | Takahashi et al. |
| 6,482,017 | B1 | 11/2002 | Van Doorn |
| 6,503,103 | B1 | 1/2003 | Cohen et al. |
| 6,506,076 | B2 | 1/2003 | Cohen et al. |
| 6,517,360 | B1 | 2/2003 | Cohen |
| 6,530,790 | B1 | 3/2003 | McNamara et al. |
| 6,537,087 | B2 | 3/2003 | McNamara et al. |
| 6,540,559 | B1 | 4/2003 | Kemmick et al. |
| 6,551,140 | B2 | 4/2003 | Billman et al. |
| 6,554,647 | B1 | 4/2003 | Cohen et al. |
| 6,565,387 | B2 | 5/2003 | Cohen |
| 6,565,390 | B2 | 5/2003 | Wu |
| 6,579,116 | B2 | 6/2003 | Brennan et al. |
| 6,582,244 | B2 | 6/2003 | Fogg et al. |
| 6,592,381 | B2 | 7/2003 | Cohen et al. |
| 6,595,801 | B1 | 7/2003 | Leonard et al. |
| 6,595,802 | B1 | 7/2003 | Watanabe et al. |
| 6,602,095 | B2 | 8/2003 | Astbury, Jr. et al. |
| 6,607,402 | B2 | 8/2003 | Cohen et al. |
| 6,609,922 | B2 | 8/2003 | Torii |
| 6,616,864 | B1 | 9/2003 | Jiang et al. |
| 6,652,318 | B1 | 11/2003 | Winings et al. |
| 6,652,319 | B1 | 11/2003 | Billman |
| 6,655,966 | B2 | 12/2003 | Rothermel et al. |
| 6,709,294 | B1 | 3/2004 | Cohen et al. |
| 6,713,672 | B1 | 3/2004 | Stickney |
| 6,726,492 | B1 | 4/2004 | Yu |
| 6,743,057 | B2 | 6/2004 | Davis et al. |
| 6,776,659 | B1 | 8/2004 | Stokoe et al. |
| 6,786,771 | B2 | 9/2004 | Gailus |
| 6,808,420 | B2 | 10/2004 | Whiteman, Jr. et al. |
| 6,814,619 | B1 | 11/2004 | Stokoe et al. |
| 6,830,489 | B2 | 12/2004 | Aoyama |
| 6,872,085 | B1 | 3/2005 | Cohen et al. |
| 6,875,031 | B1 | 4/2005 | Korsunsky et al. |
| 6,932,649 | B1 | 8/2005 | Rothermel et al. |
| 6,979,202 | B2 | 12/2005 | Benham et al. |
| 6,979,226 | B2 | 12/2005 | Otsu et al. |
| 6,986,681 | B2 | 1/2006 | Tsai |
| 7,044,794 | B2 | 5/2006 | Consoli et al. |
| 7,057,570 | B2 | 6/2006 | Irion, II et al. |
| 7,074,086 | B2 | 7/2006 | Cohen et al. |
| 7,086,872 | B2 | 8/2006 | Myer et al. |
| 7,094,102 | B2 | 8/2006 | Cohen et al. |
| 7,104,842 | B1 | 9/2006 | Huang et al. |
| 7,108,556 | B2 | 9/2006 | Cohen et al. |
| 7,156,672 | B2 | 1/2007 | Fromm et al. |
| 7,163,421 | B1 | 1/2007 | Cohen et al. |
| 7,232,344 | B1 | 6/2007 | Gillespie et al. |
| 7,285,018 | B2 | 10/2007 | Kenny et al. |
| 7,316,585 | B2 | 1/2008 | Smith et al. |
| 7,318,740 | B1 | 1/2008 | Henry et al. |
| 7,320,614 | B2 | 1/2008 | Toda et al. |
| 7,322,845 | B2 | 1/2008 | Regnier et al. |
| 7,331,822 | B2 | 2/2008 | Chen n |
| 7,335,063 | B2 | 2/2008 | Cohen et al. |

(56) References Cited

U.S. PATENT DOCUMENTS

| | | | |
|---|---|---|---|
| 7,364,464 | B2 | 4/2008 | Iino et al. |
| 7,371,117 | B2 | 5/2008 | Gailus |
| 7,407,413 | B2 | 8/2008 | Minich |
| 7,467,977 | B1 | 12/2008 | Yi et al. |
| 7,473,124 | B1 | 1/2009 | Briant et al. |
| 7,494,383 | B2 | 2/2009 | Cohen et al. |
| 7,540,781 | B2 | 6/2009 | Kenny et al. |
| 7,581,990 | B2 | 9/2009 | Kirk et al. |
| 7,588,464 | B2 | 9/2009 | Kim |
| 7,604,502 | B2 | 10/2009 | Pan |
| 7,645,165 | B2 | 1/2010 | Wu et al. |
| 7,690,946 | B2 | 4/2010 | Knaub et al. |
| 7,699,644 | B2 | 4/2010 | Szczesny et al. |
| 7,722,401 | B2 | 5/2010 | Kirk et al. |
| 7,727,027 | B2 | 6/2010 | Chiang et al. |
| 7,727,028 | B1 | 6/2010 | Zhang et al. |
| 7,731,537 | B2 | 6/2010 | Amleshi et al. |
| 7,753,731 | B2 | 7/2010 | Cohen et al. |
| 7,771,233 | B2 | 8/2010 | Gailus |
| 7,789,676 | B2 | 9/2010 | Morgan et al. |
| 7,794,240 | B2 | 9/2010 | Cohen et al. |
| 7,794,278 | B2 | 9/2010 | Cohen et al. |
| 7,806,729 | B2 | 10/2010 | Nguyen et al. |
| 7,824,192 | B2 | 11/2010 | Lin et al. |
| 7,871,296 | B2 | 1/2011 | Fowler et al. |
| 7,874,873 | B2 | 1/2011 | Do et al. |
| 7,883,369 | B1 | 2/2011 | Sun et al. |
| 7,887,371 | B2 | 2/2011 | Kenny et al. |
| 7,887,379 | B2 | 2/2011 | Kirk |
| 7,906,730 | B2 | 3/2011 | Atkinson et al. |
| 7,914,304 | B2 | 3/2011 | Cartier et al. |
| 7,946,889 | B2 | 5/2011 | Mizumura |
| 7,985,097 | B2 | 7/2011 | Gulla |
| 7,993,147 | B2 | 8/2011 | Cole et al. |
| 8,018,733 | B2 | 9/2011 | Jia |
| 8,083,553 | B2 | 12/2011 | Manter et al. |
| 8,123,544 | B2 | 2/2012 | Kobayashi |
| 8,182,289 | B2 | 5/2012 | Stokoe et al. |
| 8,215,968 | B2 | 7/2012 | Cartier et al. |
| 8,216,001 | B2 | 7/2012 | Kirk |
| 8,262,411 | B2 | 9/2012 | Kondo |
| 8,272,877 | B2 | 9/2012 | Stokoe et al. |
| 8,337,247 | B2 | 12/2012 | Zhu |
| 8,348,701 | B1 | 1/2013 | Lan et al. |
| 8,371,875 | B2 | 2/2013 | Gailus |
| 8,382,524 | B2 | 2/2013 | Khilchenko et al. |
| 8,440,637 | B2 | 5/2013 | Elmen |
| 8,480,432 | B2 | 7/2013 | Wu |
| 8,506,319 | B2 | 8/2013 | Ritter et al. |
| 8,506,331 | B2 | 8/2013 | Wu |
| 8,545,253 | B2 | 10/2013 | Amidon et al. |
| 8,550,861 | B2 | 10/2013 | Cohen et al. |
| 8,597,051 | B2 | 12/2013 | Yang et al. |
| 8,657,627 | B2 | 2/2014 | McNamara et al. |
| 8,715,003 | B2 | 5/2014 | Buck et al. |
| 8,715,005 | B2 | 5/2014 | Pan |
| 8,740,637 | B2 | 6/2014 | Wang et al. |
| 8,764,492 | B2 | 7/2014 | Chiang |
| 8,771,016 | B2 | 7/2014 | Atkinson et al. |
| 8,864,506 | B2 | 10/2014 | Little |
| 8,864,521 | B2 | 10/2014 | Atkinson et al. |
| 8,905,777 | B2 | 12/2014 | Zhu et al. |
| 8,926,377 | B2 | 1/2015 | Kirk et al. |
| 8,944,831 | B2 | 2/2015 | Stoner et al. |
| 8,968,034 | B2 | 3/2015 | Hsu |
| 8,998,642 | B2 | 4/2015 | Manter et al. |
| 9,004,942 | B2 | 4/2015 | Paniauqa |
| 9,011,177 | B2 | 4/2015 | Lloyd et al. |
| 9,022,806 | B2 | 5/2015 | Cartier, Jr. et al. |
| 9,028,281 | B2 | 5/2015 | Kirk et al. |
| 9,065,230 | B2 | 6/2015 | Milbrand, Jr. |
| 9,124,009 | B2 | 9/2015 | Atkinson et al. |
| 9,219,335 | B2 | 12/2015 | Atkinson et al. |
| 9,225,085 | B2 | 12/2015 | Cartier, Jr. et al. |
| 9,246,253 | B1 | 1/2016 | Defibaugh et al. |
| 9,257,778 | B2 | 2/2016 | Buck et al. |
| 9,257,794 | B2 | 2/2016 | Wanha et al. |
| 9,263,835 | B2 | 2/2016 | Guo |
| 9,281,590 | B1 | 3/2016 | Liu et al. |
| 9,287,668 | B2 | 3/2016 | Chen et al. |
| 9,300,074 | B2 | 3/2016 | Gailus |
| 9,337,585 | B1 | 5/2016 | Yang |
| 9,350,095 | B2 | 5/2016 | Arichika et al. |
| 9,431,734 | B2 | 8/2016 | Guo et al. |
| 9,450,344 | B2 | 9/2016 | Cartier, Jr. et al. |
| 9,484,674 | B2 | 11/2016 | Cartier, Jr. et al. |
| 9,509,101 | B2 | 11/2016 | Cartier, Jr. et al. |
| 9,520,686 | B2 | 12/2016 | Hu et al. |
| 9,520,689 | B2 | 12/2016 | Cartier, Jr. et al. |
| 9,537,250 | B2 | 1/2017 | Kao et al. |
| 9,640,915 | B2 | 5/2017 | Phillips |
| 9,692,183 | B2 | 6/2017 | Phillips |
| 9,742,132 | B1 | 8/2017 | Hsueh |
| 9,831,605 | B2 | 11/2017 | Buck et al. |
| 9,843,135 | B2 | 12/2017 | Guetig et al. |
| 9,935,385 | B2 | 4/2018 | Phillips et al. |
| 9,972,945 | B1 | 5/2018 | Huang et al. |
| 9,997,853 | B2 | 6/2018 | Little et al. |
| 9,997,871 | B2 | 6/2018 | Zhong |
| 10,122,129 | B2 | 11/2018 | Milbrand, Jr. et al. |
| 10,135,197 | B2 | 11/2018 | Little et al. |
| 10,141,697 | B2 * | 11/2018 | Wang ................. H01R 13/6581 |
| 10,211,577 | B2 | 2/2019 | Milbrand, Jr. et al. |
| 10,243,304 | B2 | 3/2019 | Kirk et al. |
| 10,270,191 | B1 | 4/2019 | Li et al. |
| 10,276,995 | B2 | 4/2019 | Little |
| 10,283,910 | B1 | 5/2019 | Chen et al. |
| 10,320,102 | B2 | 6/2019 | Phillips et al. |
| 10,320,125 | B2 | 6/2019 | Ju et al. |
| 10,348,040 | B2 | 7/2019 | Cartier, Jr. et al. |
| 10,381,767 | B1 | 8/2019 | Milbrand, Jr. et al. |
| 10,431,936 | B2 | 10/2019 | Horning et al. |
| 10,439,311 | B2 | 10/2019 | Phillips et al. |
| 10,511,128 | B2 | 12/2019 | Kirk et al. |
| 10,541,482 | B2 | 1/2020 | Sasame et al. |
| 10,573,987 | B2 | 2/2020 | Osaki et al. |
| 10,601,181 | B2 | 3/2020 | Lu et al. |
| 10,680,387 | B2 | 6/2020 | Cheng et al. |
| 10,714,875 | B2 | 7/2020 | Wan et al. |
| 10,777,921 | B2 | 9/2020 | Lu et al. |
| 10,797,446 | B2 * | 10/2020 | Liu .................... H01R 13/6581 |
| 10,826,214 | B2 | 11/2020 | Phillips et al. |
| 10,833,437 | B2 | 11/2020 | Huang et al. |
| 10,840,622 | B2 | 11/2020 | Sasame et al. |
| 10,965,064 | B2 | 3/2021 | Hsu et al. |
| 11,146,025 | B2 | 10/2021 | Lu et al. |
| 11,264,755 | B2 | 3/2022 | Te |
| 11,381,015 | B2 * | 7/2022 | Lu .......................... H01R 13/26 |
| 11,444,397 | B2 | 9/2022 | Sasame et al. |
| 2001/0012730 | A1 | 8/2001 | Ramey et al. |
| 2001/0042632 | A1 | 11/2001 | Manov et al. |
| 2001/0046810 | A1 | 11/2001 | Cohen et al. |
| 2002/0042223 | A1 | 4/2002 | Belopolsky et al. |
| 2002/0061671 | A1 | 5/2002 | Torii |
| 2002/0089464 | A1 | 7/2002 | Joshi |
| 2002/0098738 | A1 | 7/2002 | Astbury et al. |
| 2002/0111068 | A1 | 8/2002 | Cohen et al. |
| 2002/0111069 | A1 | 8/2002 | Astbury et al. |
| 2002/0123266 | A1 | 9/2002 | Ramey et al. |
| 2002/0132518 | A1 | 9/2002 | Kobayashi |
| 2002/0146926 | A1 | 10/2002 | Fogg et al. |
| 2003/0119360 | A1 | 6/2003 | Jiang et al. |
| 2003/0220018 | A1 | 11/2003 | Winings et al. |
| 2004/0005815 | A1 | 1/2004 | Mizumura et al. |
| 2004/0020674 | A1 | 2/2004 | McFadden et al. |
| 2004/0058572 | A1 | 3/2004 | Fromm et al. |
| 2004/0115968 | A1 | 6/2004 | Cohen |
| 2004/0121652 | A1 | 6/2004 | Gailus |
| 2004/0171305 | A1 | 9/2004 | McGowan et al. |
| 2004/0196112 | A1 | 10/2004 | Welbon et al. |
| 2004/0235352 | A1 | 11/2004 | Takemasa |
| 2004/0259419 | A1 | 12/2004 | Payne et al. |
| 2005/0048818 | A1 | 3/2005 | Pan |
| 2005/0048838 | A1 | 3/2005 | Korsunsky et al. |

(56) References Cited

U.S. PATENT DOCUMENTS

| | | | |
|---|---|---|---|
| 2005/0048842 | A1 | 3/2005 | Benham et al. |
| 2005/0070160 | A1 | 3/2005 | Cohen et al. |
| 2005/0133245 | A1 | 6/2005 | Katsuyama et al. |
| 2005/0176835 | A1 | 8/2005 | Kobayashi et al. |
| 2005/0233610 | A1 | 10/2005 | Tutt et al. |
| 2005/0283974 | A1 | 12/2005 | Richard et al. |
| 2005/0287869 | A1 | 12/2005 | Kenny et al. |
| 2006/0019525 | A1 | 1/2006 | Lloyd et al. |
| 2006/0068640 | A1 | 3/2006 | Gailus |
| 2006/0166560 | A1 | 7/2006 | Shuey et al. |
| 2006/0255876 | A1 | 11/2006 | Kushta et al. |
| 2006/0276082 | A1 | 12/2006 | Hung et al. |
| 2006/0292932 | A1 | 12/2006 | Benham et al. |
| 2007/0004282 | A1 | 1/2007 | Cohen et al. |
| 2007/0004828 | A1 | 1/2007 | Khabbaz |
| 2007/0021000 | A1 | 1/2007 | Laurx |
| 2007/0021001 | A1 | 1/2007 | Laurx et al. |
| 2007/0021002 | A1 | 1/2007 | Laurx et al. |
| 2007/0021003 | A1 | 1/2007 | Laurx et al. |
| 2007/0021004 | A1 | 1/2007 | Laurx et al. |
| 2007/0037419 | A1 | 2/2007 | Sparrowhawk |
| 2007/0042639 | A1 | 2/2007 | Manter et al. |
| 2007/0054554 | A1 | 3/2007 | Do et al. |
| 2007/0059961 | A1 | 3/2007 | Cartier et al. |
| 2007/0155241 | A1 | 7/2007 | Lappohn |
| 2007/0197063 | A1 | 8/2007 | Ngo et al. |
| 2007/0218765 | A1 | 9/2007 | Cohen et al. |
| 2007/0243764 | A1 | 10/2007 | Liu et al. |
| 2007/0293084 | A1 | 12/2007 | Ngo |
| 2008/0020640 | A1 | 1/2008 | Zhang et al. |
| 2008/0194146 | A1 | 8/2008 | Gailus |
| 2008/0246555 | A1 | 10/2008 | Kirk et al. |
| 2008/0248658 | A1 | 10/2008 | Cohen et al. |
| 2008/0248659 | A1 | 10/2008 | Cohen et al. |
| 2008/0248660 | A1 | 10/2008 | Kirk et al. |
| 2009/0011641 | A1 | 1/2009 | Cohen et al. |
| 2009/0011645 | A1 | 1/2009 | Laurx et al. |
| 2009/0035955 | A1 | 2/2009 | McNamara |
| 2009/0061661 | A1 | 3/2009 | Shuey et al. |
| 2009/0117386 | A1 | 5/2009 | Vacanti et al. |
| 2009/0203259 | A1 | 8/2009 | Nguyen et al. |
| 2009/0239395 | A1 | 9/2009 | Cohen et al. |
| 2009/0258516 | A1 | 10/2009 | Hiew et al. |
| 2009/0291593 | A1 | 11/2009 | Atkinson et al. |
| 2009/0305530 | A1 | 12/2009 | Ito et al. |
| 2009/0305533 | A1 | 12/2009 | Feldman et al. |
| 2009/0305553 | A1 | 12/2009 | Thomas et al. |
| 2010/0048058 | A1 | 2/2010 | Morgan et al. |
| 2010/0068934 | A1 | 3/2010 | Li et al. |
| 2010/0075538 | A1 | 3/2010 | Ohshida |
| 2010/0081302 | A1 | 4/2010 | Atkinson et al. |
| 2010/0112846 | A1 | 5/2010 | Kotaka |
| 2010/0124851 | A1 | 5/2010 | Xiong et al. |
| 2010/0144167 | A1 | 6/2010 | Fedder et al. |
| 2010/0203772 | A1 | 8/2010 | Mao et al. |
| 2010/0291806 | A1 | 11/2010 | Minich et al. |
| 2010/0294530 | A1 | 11/2010 | Atkinson et al. |
| 2011/0003509 | A1 | 1/2011 | Gailus |
| 2011/0067237 | A1 | 3/2011 | Cohen et al. |
| 2011/0104948 | A1 | 5/2011 | Girard, Jr. et al. |
| 2011/0130038 | A1 | 6/2011 | Cohen et al. |
| 2011/0143605 | A1 | 6/2011 | Pepe |
| 2011/0212649 | A1 | 9/2011 | Stokoe et al. |
| 2011/0212650 | A1 | 9/2011 | Amleshi et al. |
| 2011/0230095 | A1 | 9/2011 | Atkinson et al. |
| 2011/0230096 | A1 | 9/2011 | Atkinson et al. |
| 2011/0256739 | A1 | 10/2011 | Toshiyuki et al. |
| 2011/0287663 | A1 | 11/2011 | Gailus et al. |
| 2012/0094536 | A1 | 4/2012 | Khilchenko et al. |
| 2012/0156929 | A1 | 6/2012 | Manter et al. |
| 2012/0184145 | A1 | 7/2012 | Zeng |
| 2012/0184154 | A1 | 7/2012 | Frank et al. |
| 2012/0202363 | A1 | 8/2012 | McNamara et al. |
| 2012/0202386 | A1 | 8/2012 | McNamara et al. |
| 2012/0214344 | A1 | 8/2012 | Cohen et al. |
| 2013/0012038 | A1 | 1/2013 | Kirk et al. |
| 2013/0017733 | A1 | 1/2013 | Kirk et al. |
| 2013/0065454 | A1 | 3/2013 | Milbrand Jr. |
| 2013/0078870 | A1 | 3/2013 | Milbrand, Jr. |
| 2013/0078871 | A1 | 3/2013 | Milbrand, Jr. |
| 2013/0090001 | A1 | 4/2013 | Kagotani |
| 2013/0109232 | A1 | 5/2013 | Paniaqua |
| 2013/0143442 | A1 | 6/2013 | Cohen et al. |
| 2013/0196553 | A1 | 8/2013 | Gailus |
| 2013/0217263 | A1 | 8/2013 | Pan |
| 2013/0225006 | A1 | 8/2013 | Khilchenko et al. |
| 2013/0237100 | A1 | 9/2013 | Affeltranger |
| 2013/0316590 | A1 | 11/2013 | Hon |
| 2014/0004724 | A1 | 1/2014 | Cartier, Jr. et al. |
| 2014/0004726 | A1 | 1/2014 | Cartier, Jr. et al. |
| 2014/0004746 | A1 | 1/2014 | Cartier, Jr. et al. |
| 2014/0024263 | A1 | 1/2014 | Dong et al. |
| 2014/0057498 | A1 | 2/2014 | Cohen |
| 2014/0113487 | A1 | 4/2014 | Chen et al. |
| 2014/0273557 | A1 | 9/2014 | Cartier, Jr. et al. |
| 2014/0273627 | A1 | 9/2014 | Cartier, Jr. et al. |
| 2014/0370729 | A1 | 12/2014 | Wang |
| 2014/0377992 | A1 | 12/2014 | Chang et al. |
| 2015/0056856 | A1 | 2/2015 | Atkinson et al. |
| 2015/0072546 | A1 | 3/2015 | Li |
| 2015/0099408 | A1 | 4/2015 | Myer et al. |
| 2015/0111401 | A1 | 4/2015 | Guo |
| 2015/0111427 | A1 | 4/2015 | Foxconn |
| 2015/0126068 | A1 | 5/2015 | Fang |
| 2015/0140866 | A1 | 5/2015 | Tsai et al. |
| 2015/0214673 | A1 | 7/2015 | Gao et al. |
| 2015/0236451 | A1 | 8/2015 | Cartier, Jr. et al. |
| 2015/0236452 | A1 | 8/2015 | Cartier, Jr. et al. |
| 2015/0255904 | A1 | 9/2015 | Ito |
| 2015/0255926 | A1 | 9/2015 | Paniagua |
| 2015/0340798 | A1 | 11/2015 | Kao et al. |
| 2016/0149343 | A1 | 5/2016 | Atkinson et al. |
| 2016/0268744 | A1 | 9/2016 | Little et al. |
| 2017/0077654 | A1 | 3/2017 | Yao et al. |
| 2017/0352970 | A1 | 12/2017 | Liang et al. |
| 2018/0062323 | A1 | 3/2018 | Kirk et al. |
| 2018/0076555 | A1 | 3/2018 | Scholeno et al. |
| 2018/0145438 | A1 | 5/2018 | Cohen |
| 2018/0198220 | A1 | 7/2018 | Sasame et al. |
| 2018/0205177 | A1 | 7/2018 | Zhou et al. |
| 2018/0212376 | A1 | 7/2018 | Wang et al. |
| 2018/0212385 | A1 | 7/2018 | Little |
| 2018/0219331 | A1 | 8/2018 | Cartier, Jr. et al. |
| 2018/0241156 | A1 | 8/2018 | Huang et al. |
| 2018/0269607 | A1 | 9/2018 | Wu et al. |
| 2018/0331444 | A1 | 11/2018 | Ono |
| 2019/0006778 | A1 | 1/2019 | Fan et al. |
| 2019/0044284 | A1 | 2/2019 | Dunham |
| 2019/0052019 | A1 | 2/2019 | Huang et al. |
| 2019/0067854 | A1 | 2/2019 | Ju et al. |
| 2019/0173209 | A1 | 6/2019 | Lu et al. |
| 2019/0173232 | A1 | 6/2019 | Lu et al. |
| 2019/0214755 | A1 | 7/2019 | Manickam |
| 2019/0334292 | A1 | 10/2019 | Cartier, Jr. et al. |
| 2020/0021052 | A1 | 1/2020 | Milbrand, Jr. et al. |
| 2020/0076135 | A1 | 3/2020 | Tang et al. |
| 2020/0153134 | A1 | 5/2020 | Sasame et al. |
| 2020/0161811 | A1 | 5/2020 | Lu |
| 2020/0203865 | A1 | 6/2020 | Wu et al. |
| 2020/0203867 | A1 | 6/2020 | Lu |
| 2020/0203886 | A1 | 6/2020 | Wu et al. |
| 2020/0235529 | A1 | 7/2020 | Kirk et al. |
| 2020/0259294 | A1 | 8/2020 | Lu |
| 2020/0266584 | A1 | 8/2020 | Lu |
| 2020/0335914 | A1 | 10/2020 | Hsu et al. |
| 2020/0358226 | A1 | 11/2020 | Lu et al. |
| 2020/0395698 | A1 | 12/2020 | Hou et al. |
| 2020/0403350 | A1 | 12/2020 | Hsu |
| 2021/0036452 | A1 | 2/2021 | Phillips et al. |
| 2021/0050683 | A1 | 2/2021 | Sasame et al. |
| 2021/0135389 | A1 | 5/2021 | Jiang |
| 2021/0135403 | A1 | 5/2021 | Yang et al. |
| 2021/0135404 | A1 | 5/2021 | Jiang |
| 2021/0203104 | A1 | 7/2021 | Chen |

(56) References Cited

U.S. PATENT DOCUMENTS

| | | | |
|---|---|---|---|
| 2021/0218195 A1 | 7/2021 | Hsu et al. | |
| 2021/0399449 A1 | 12/2021 | Guo et al. | |
| 2022/0059954 A1 | 2/2022 | Yue | |
| 2022/0069496 A1 | 3/2022 | Yi et al. | |
| 2022/0077632 A1 | 3/2022 | Chen et al. | |

FOREIGN PATENT DOCUMENTS

| | | | |
|---|---|---|---|
| CN | 1275825 | A | 12/2000 |
| CN | 2519434 | Y | 10/2002 |
| CN | 1179448 | C | 12/2004 |
| CN | 1650479 | A | 8/2005 |
| CN | 1799290 | A | 7/2006 |
| CN | 2896615 | Y | 5/2007 |
| CN | 1996678 | A | 7/2007 |
| CN | 2930006 | Y | 8/2007 |
| CN | 101019277 | A | 8/2007 |
| CN | 101176389 | A | 5/2008 |
| CN | 101208837 | A | 6/2008 |
| CN | 101312275 | A | 11/2008 |
| CN | 201323275 | Y | 10/2009 |
| CN | 101600293 | A | 12/2009 |
| CN | 201374434 | Y | 12/2009 |
| CN | 101752700 | A | 6/2010 |
| CN | 101790818 | A | 7/2010 |
| CN | 101120490 | B | 11/2010 |
| CN | 101926055 | A | 12/2010 |
| CN | 201846527 | U | 5/2011 |
| CN | 102106041 | A | 6/2011 |
| CN | 201868621 | U | 6/2011 |
| CN | 102195173 | A | 9/2011 |
| CN | 102224640 | A | 10/2011 |
| CN | 102232259 | A | 11/2011 |
| CN | 102239605 | A | 11/2011 |
| CN | 102292881 | A | 12/2011 |
| CN | 101600293 | B | 5/2012 |
| CN | 102456990 | A | 5/2012 |
| CN | 102487166 | A | 6/2012 |
| CN | 102593661 | A | 7/2012 |
| CN | 102598430 | A | 7/2012 |
| CN | 202395248 | U | 8/2012 |
| CN | 102694318 | A | 9/2012 |
| CN | 102738621 | A | 10/2012 |
| CN | 102859805 | A | 1/2013 |
| CN | 202695788 | U | 1/2013 |
| CN | 202695861 | U | 1/2013 |
| CN | 203445304 | U | 2/2014 |
| CN | 103840285 | A | 6/2014 |
| CN | 203690614 | U | 7/2014 |
| CN | 204030057 | U | 12/2014 |
| CN | 204167554 | U | 2/2015 |
| CN | 104409906 | A | 3/2015 |
| CN | 104577577 | A | 4/2015 |
| CN | 104659573 | A | 5/2015 |
| CN | 204349140 | U | 5/2015 |
| CN | 204577746 | U | 8/2015 |
| CN | 204696287 | U | 10/2015 |
| CN | 105633660 | A | 6/2016 |
| CN | 105703103 | A | 6/2016 |
| CN | 106099546 | A | 11/2016 |
| CN | 107069281 | A | 8/2017 |
| CN | 304240766 | S | 8/2017 |
| CN | 304245430 | S | 8/2017 |
| CN | 206712072 | U | 12/2017 |
| CN | 206712089 | U | 12/2017 |
| CN | 107706632 | A | 2/2018 |
| CN | 207677189 | U | 7/2018 |
| CN | 208078300 | U | 11/2018 |
| CN | 208209042 | U | 12/2018 |
| CN | 208797273 | U | 4/2019 |
| CN | 210326355 | U | 4/2020 |
| CN | 112072400 | A | 12/2020 |
| CN | 212412336 | U | 1/2021 |
| CN | 107706675 | B | 4/2021 |
| CN | 212874843 | U | 4/2021 |
| CN | 113517619 | A | 10/2021 |
| DE | 60216728 | T2 | 11/2007 |
| EP | 0 560 551 | A1 | 9/1993 |
| EP | 0 820 124 | A2 | 1/1998 |
| EP | 1 018 784 | A1 | 7/2000 |
| EP | 1 779 472 | A1 | 5/2007 |
| EP | 2 169 770 | A2 | 3/2010 |
| EP | 2 405 537 | A1 | 1/2012 |
| GB | 1049435 | A | 11/1966 |
| GB | 1272347 | A | 4/1972 |
| JP | H3-156761 | A2 | 7/1991 |
| JP | H07-302649 | A | 11/1995 |
| JP | 2001-510627 | A | 7/2001 |
| JP | 2002-151190 | A2 | 5/2002 |
| JP | 2006-344524 | A | 12/2006 |
| JP | 2010-129173 | A | 6/2010 |
| MX | 9907324 | A1 | 8/2000 |
| TW | 200835073 | A | 8/2008 |
| TW | M357771 | U | 5/2009 |
| TW | M474278 | U | 3/2014 |
| TW | M502979 | U | 6/2015 |
| TW | I535129 | B | 5/2016 |
| TW | M534922 | U | 1/2017 |
| TW | I596840 | B | 8/2017 |
| TW | M558481 | U | 4/2018 |
| TW | M558482 | U | 4/2018 |
| TW | M558483 | U | 4/2018 |
| TW | M559006 | U | 4/2018 |
| TW | M559007 | U | 4/2018 |
| TW | M560138 | U | 5/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M605564 | U | 12/2020 |
| TW | M613035 | U | 6/2021 |
| WO | WO 88/05218 | A1 | 7/1988 |
| WO | WO 98/35409 | A1 | 8/1998 |
| WO | WO 2004/059794 | A2 | 7/2004 |
| WO | WO 2004/059801 | A1 | 7/2004 |
| WO | WO 2006/039277 | A1 | 4/2006 |
| WO | WO 2007/005597 | A2 | 1/2007 |
| WO | WO 2007/005599 | A1 | 1/2007 |
| WO | WO 2008/124052 | A2 | 10/2008 |
| WO | WO 2008/124054 | A2 | 10/2008 |
| WO | WO 2008/124057 | A2 | 10/2008 |
| WO | WO 2008/124101 | A2 | 10/2008 |
| WO | WO 2010/030622 | A1 | 3/2010 |
| WO | WO 2010/039188 | A1 | 4/2010 |
| WO | WO 2011/100740 | A2 | 8/2011 |
| WO | WO 2017/007429 | A1 | 1/2017 |

OTHER PUBLICATIONS

Chinese Office Action dated Jan. 18, 2021 in connection with Chinese Application No. 202010031395.7.
Chinese Office Action for Application No. 201680051491.X dated Apr. 30, 2019.
Chinese Office Action for Chinese Application No. 201580014851.4 dated Sep. 4, 2019.
Chinese Office Action for Chinese Application No. 201780064531.9 dated Jan. 2, 2020.
Chinese Office Action for Chinese Application No. 201780097919.9, dated Dec. 3, 2021.
Chinese Office Action for Chinese Application No. 201780097919.9, dated Mar. 10, 2021.
European Communication Pursuant to Article 94(3) EPC dated Sep. 8, 2022 for European Application No. 17930428.2.
Extended European Search Report dated May 19, 2021 in connection with European Application No. 17930428.2.
Extended European Search Report for European Application No. EP 11166820.8 mailed Jan. 24, 2012.
International Preliminary Report on Patentability Chapter II for International Application No. PCT/CN2017/108344 mailed Mar. 6, 2020.

(56) References Cited

OTHER PUBLICATIONS

International Preliminary Report on Patentability for International Application No. PCT/US2010/056482 mailed May 24, 2012.
International Preliminary Report on Patentability for International Application No. PCT/US2011/026139 mailed Sep. 7, 2012.
International Preliminary Report on Patentability for International Application No. PCT/US2012/023689 mailed Aug. 15, 2013.
International Preliminary Report on Patentability for International Application No. PCT/SG2016/050317 dated Jan. 18, 2018.
International Search Report and Written Opinion for International Application No. PCT/CN2017/108344 dated Aug. 1, 2018.
International Search Report and Written Opinion for International Application No. PCT/US2010/056482 mailed Mar. 14, 2011.
International Search Report and Written Opinion for International Application No. PCT/US2011/026139 mailed Nov. 22, 2011.
International Search Report and Written Opinion for International Application No. PCT/US2012/023689 mailed Sep. 12, 2012.
International Search Report and Written Opinion for International Application No. PCT/US2012/060610 mailed Mar. 29, 2013.
International Search Report and Written Opinion for International Application No. PCT/US2015/012463 mailed May 13, 2015.
International Search Report and Written Opinion for International Application No. PCT/US2017/047905 dated Dec. 4, 2017.
International Search Report and Written Opinion for International Application No. PCT/US2005/034605 mailed Jan. 26, 2006.
International Search Report and Written Opinion for International Application No. PCT/US2011/034747 mailed Jul. 28, 2011.
International Search Report and Written Opinion for International Application No. PCT/SG2016/050317 dated Oct. 18, 2016.
International Search Report and Written Opinion mailed Jul. 18, 2019 for International Application No. PCT/CN2018/118798.
International Search Report and Written Opinion mailed Nov. 29, 2021 for International Application No. PCT/CN2021/114671.
International Search Report with Written Opinion for International Application No. PCT/US2006/025562 mailed Oct. 31, 2007.
Taiwanese Office Action dated Jun. 16, 2022 for Taiwan Application No. 107138468.
[No Author Listed], Carbon Nanotubes For Electromagnetic Interference Shielding. SBIR/STTR. Award Information. Program Year 2001. Fiscal Year 2001. Materials Research Institute, LLC. Chu et al. Available at http://sbir.gov/sbirsearch/detail/225895. Last accessed Sep. 19, 2013.
[No Author Listed], High Speed Backplane Connectors. Tyco Electronics. Product Catalog No. 1773095. Revised Dec. 1, 2008—40 pages.
[No Author Listed], MCIO 124pos 85ohm. Amphenol Assembletech. 1 page. URL:http://www.amphenol-ast.com/v3/en/overview.aspx?classId=234 [retrieved on Apr. 11, 2022].
[No Author Listed], Military Fibre Channel High Speed Cable Assembly. www.gore.com. 2008. [last accessed Aug. 2, 2012 via Internet Archive: Wayback Machine http://web.archive.org] Link archived: http://www.gore.com/en.sub.--xx/products/cables/copper/networking/militar-y/military.sub.--fibre . . . Last archive date Apr. 6, 2008.
[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].
[No Author Listed], Mini Cool Edge IO Connector. Commercial IO. Amphenol ICC. 5 pages. URL:https://cdn.amphenol-icc.com/media/wysiwyg/files/documentation/datasheet/inputoutput/io_mini_cool_edge_io.pdf [retrieved on Apr. 11, 2022].
[No Author Listed], SFF-TA-1016 Specification for Internal Unshielded High Speed Connector System. Rev 0.0.1. SNIA SFF TWG Technology Affiliate. Nov. 15, 2019. 40 pages.
Beaman, High Performance Mainframe Computer Cables. 1997 Electronic Components and Technology Conference. 1997;911-7.
Hsu, Compact Electrical Connector, U.S. Appl. No. 17/867,067, filed Jul. 18, 2022.
Reich et al., Microwave Theory and Techniques. Boston Technical Publishers, Inc. 1965;182-91.
Sasame et al., Electrical connector with cavity between terminals, U.S. Appl. No. 17/942,435, filed Sep. 12, 2022.
Shi et al. Improving Signal Integrity in Circuit Boards by Incorporating Absorbing Materials. 2001 Proceedings. 51st Electronic Components and Technology Conference, Orlando FL. 2001:1451-56.
U.S. Appl. No. 16/760,400, filed Apr. 29, 2020, Hou et al.
U.S. Appl. No. 16/998,845, filed Aug. 20, 2020, Yue.
U.S. Appl. No. 17/089,905, filed Nov. 5, 2020, Jiang.
U.S. Appl. No. 17/089,934, filed Nov. 5, 2020, Jiang.
U.S. Appl. No. 17/216,463, filed Mar. 29, 2021, Hsu et al.
U.S. Appl. No. 17/283,511, filed Apr. 7, 2021, Guo et al.
U.S. Appl. No. 17/402,255, filed Aug. 13, 2021, Yi et al.
U.S. Appl. No. 17/867,067, filed Jul. 18, 2022, Hsu.
U.S. Appl. No. 17/942,435, filed Sep. 12, 2022, Sasame et al.
CN 201580014851.4, Jun. 1, 2020, Chinese Communication.
CN 201580014851.4, Sep. 4, 2019, Chinese Office Action.
CN 201680051491.X, Apr. 30, 2019, Chinese Office Action.
CN 201780064531.9, Jan. 2, 2020, Chinese Office Action.
CN 201780097919.9, Dec. 3, 2021, Chinese Office Action.
CN 201780097919.9, Mar. 10, 2021, Chinese Office Action.
CN 202010031395.7, Jan. 18, 2021, Chinese Office Action.
EP 11166820.8, Jan. 24, 2012, Extended European Search Report.
EP 17930428.2, Sep. 8, 2022, European Communication.
EP 17930428.2, May 19, 2021, Extended European Search Report.
PCT/CN2017/108344, Aug. 1, 2018, International Search Report and Written Opinion.
PCT/CN2017/108344, Mar. 6, 2020, International Preliminary Report on Patentability Chapter II.
PCT/CN2018/118798, Jul. 18, 2019, International Search Report and Written Opinion.
PCT/CN2021/114671, Nov. 29, 2021, International Search Report and Written Opinion.
PCT/SG2016/050317, Jan. 18, 2018, International Preliminary Report on Patentability.
PCT/SG2016/050317, Oct. 18, 2016, International Search Report and Written Opinion.
PCT/US2005/034605, Jan. 26, 2006, International Search Report and Written Opinion.
PCT/US2006/025562, Oct. 31, 2007, International Search Report with Written Opinion.
PCT/US2010/056482, May 24, 2012, International Preliminary Report on Patentability.
PCT/US2010/056482, Mar. 14, 2011, International Search Report and Written Opinion.
PCT/US2011/026139, Sep. 7, 2012, International Preliminary Report on Patentability.
PCT/US2011/026139, Nov. 22, 2011, International Search Report and Written Opinion.
PCT/US2011/034747, Jul. 28, 2011, International Search Report and Written Opinion.
PCT/US2012/023689, Aug. 15, 2013, International Preliminary Report on Patentability.
PCT/US2012/023689, Sep. 12, 2012, International Search Report and Written Opinion.
PCT/US2012/060610, Mar. 29, 2013, International Search Report and Written Opinion.
PCT/US2015/012463, May 13, 2015, International Search Report and Written Opinion.
PCT/US2017/047905, Dec. 4, 2017, International Search Report and Written Opinion.
TW 107138468, Jun. 16, 2022, Taiwanese Office Action.

* cited by examiner

ROBUST, MINIATURIZED CARD EDGE CONNECTOR

CROSS-REFERENCE TO RELATED APPLICATIONS

This application is a continuation of U.S. application Ser. No. 16/721,594, filed Dec. 19, 2019, entitled "ROBUST, MINIATURIZED CARD EDGE CONNECTOR," which claims priority to and the benefit under 35 U.S.C. § 119 to U.S. Application Ser. No. 62/783,336, filed Dec. 21, 2018, entitled "ROBUST, MINIATURIZED CARD EDGE CONNECTOR," the entire contents of which are incorporated herein by reference in their entirety.

BACKGROUND

This disclosure relates generally to electrical interconnection systems and more specifically to compact electrical connectors.

Electrical connectors are used in many electronic systems. In general, various electronic devices (such as smart phones, tablet computers, desktop computers, notebook computers and digital cameras) have been provided with various types of connectors so that the electronic devices can exchange data with each other. Therefore, it can be seen that the connectors can be used for electrical connection and signal transmission between devices, between components and between systems, and are basic components needed to make a complete system.

It is generally easier and more cost effective to manufacture a system as separate electronic assemblies, such as printed circuit boards ("PCBs"), which may be joined together with electrical connectors. In some scenarios, the PCBs to be joined each have connectors mounted to them, which may be mated to directly interconnect the PCBs.

In other scenarios, the PCB's are connected through a cable. Connectors may nonetheless be used to make such connections. The cable may be terminated at least at one end with a plug connector. A PCB may be equipped with a receptacle connector into which the plug connector can be inserted, making connections between the PCB and the cable. A similar arrangement may be used at the other end of the cable, connecting the cable to another PCB, so that signals may pass between the printed circuit boards through the cable.

SUMMARY

In some aspects, the invention may be embodied as an electrical connector, comprising an insulative member having a slot therein and a plurality of contacts disposed along parallel side walls of the slot, wherein the contacts comprise mating portions that are elongated in a mating direction. An electrically conductive member may bound at least three sides of the insulative member and may comprise a first tab, wherein the first tab comprises a tapered portion disposed at an opening of the slot.

The tab may further comprise a straight portion extending into the slot in the mating direction; and the straight portion of the first tab may extend beyond a distal tip of a mating portion of the plurality of contacts in the direction opposite the mating direction.

The insulative member may further comprise a first recessed portion, the tapered and straight portions of the first tab being disposed in the first recessed portion.

The first tab may further comprise a connecting portion connected to the tapered portion and extending in a direction perpendicular to the mating direction.

The straight portion of the first tab and the first recessed portion of the insulative member may each be disposed along a first parallel side wall of the parallel side walls; and the first recessed portion is shaped such that the straight portion, where disposed along the first parallel side wall, is no closer to a second parallel side wall of the parallel side walls than the first parallel side wall.

A surface of the straight portion of the first tab, where disposed along the first parallel side wall of the slot, may be flush with a surface of the first parallel side wall.

The tapered portion of the first tab may be disposed along the first parallel side wall of the slot; and the first recessed portion of the insulative member may be shaped such that the tapered portion, where disposed along the first parallel side wall, is no closer to the second parallel side wall of the slot than the first parallel side wall.

A surface of the tapered portion of the first tab, where disposed along the first parallel side wall of the slot, may be flush with a surface of the first parallel side wall.

The first recessed portion of the insulative member may comprise a straight portion shaped to receive the straight portion of the first tab; a tapered portion shaped to receive the tapered portion of the first tab; and an outer portion shaped to receive the connecting portion of the first tab.

The electrically conductive member may further comprise a second tab, a tapered portion of the second tab disposed at the opening of the slot on a side of the slot opposite the first tab; and a straight portion extending into the slot in the direction opposite the mating direction.

The insulative member may further comprise a second recessed portion, and the tapered portion and the straight portion of the second tab are disposed in the second recessed portion.

In another aspect, the invention may be embodied as an electrical connector, comprising: an insulative member comprising side walls and end walls bounding a slot; a plurality of contacts disposed along a first side wall of the side walls; and a metal shell comprising a body and a first tab extending from the body. The body may at least partially surrounds the insulative member, and the first tab may extend over a first end wall of the end walls so as to bound a portion of the slot.

The side walls of the insulative member may further comprise a second side wall parallel to the first side wall, and the first tab of the metal shell extending beyond the slot adjacent the first side wall in a direction along which the first side wall may be spaced from the second side wall.

The first tab of the metal shell may extend beyond the slot adjacent the second side wall of the insulative member in the direction along which the first side wall is spaced from the second side wall.

The first tab of the metal shell may comprise a first portion disposed along the first end wall of the insulative member; a second portion disposed along the first side wall of the insulative member; and a third portion disposed along the second side wall of the insulative member.

The insulative member may comprises a first recessed portion in which at the first portion of the first tab is disposed.

The first, second and third portions of the first tab may be disposed in the first recessed portion.

The plurality of contacts comprise mating portions may be elongated in a mating direction, and the first portion of the first tab may comprise a straight portion extending into the slot in the mating direction.

The second and third portions of the first tab may each comprise a straight portion extending into the slot in the mating direction.

The insulative member may further comprise a second recessed portion. The metal shell may further comprise a second tab disposed along a second end wall of the end walls parallel to the first end wall. The second tab extends beyond the slot adjacent each of the first and second side walls in the direction along which the first side wall is spaced from the second side wall. The second tab may be disposed within the second recessed portion.

The second tab may comprise a first portion disposed along the second end wall, a second portion disposed along the first side wall, and a third portion disposed along the second side wall.

The first and second side walls of the insulative member may be at least 50% thicker in the direction along which the first and second side walls are spaced from one another than the first and second end walls are in a direction along which the first and second end walls are spaced from one another.

In yet another aspect, the invention may be embodied as an electrical connector, comprising: an insulative housing comprising a slot; a plurality of contacts disposed along a first wall of the insulative housing adjacent the slot; and an electromagnetic shielding shell having a first portion at least partially surrounding the insulative housing and a second portion disposed along a second wall of the insulative housing adjacent the slot. The insulative housing may comprise a first recessed portion in the second wall. The second portion of the electromagnetic shielding shell may be at least partially disposed in the first recessed portion.

Mating portions of the plurality of contacts may be elongated in a mating direction, and the second portion of the electromagnetic shielding shell may taper in the mating direction.

The slot may be shaped to receive an engagement portion of a second electrical connector, and the second portion of the electromagnetic shielding shell may be tapered to guide the engagement portion into the slot.

The second portion of the electromagnetic shielding shell may comprise a means for guiding an engagement portion of a second electrical connector into the slot.

The electromagnetic shielding shell may further comprise a third portion extending from the second portion in the mating direction, and the third portion may be at least partially disposed in the first recessed portion of the insulative housing.

The second portion of the electromagnetic shielding shell may be disposed along the first wall of the insulative housing.

The electromagnetic shielding shell may further comprise a fourth portion disposed along a third wall of the insulative housing adjacent the slot. The insulative housing may further comprise a second recessed portion along the third wall. The third portion of the electromagnetic shielding shell may be disposed in the second recessed portion.

The fourth portion may be shaped to guide the engagement portion of the second electrical connector into the slot.

The electromagnetic shielding shell may further comprise a fifth portion extending from the fourth portion in the mating direction, the fifth portion being disposed in the second recessed portion of the insulative housing.

The fourth and fifth portions of the electromagnetic shielding shell may be disposed along the first wall of the insulative housing.

The first and second recessed portions of the insulative housing may be disposed along the first wall.

The foregoing features may be used, separately or together in any combination in any of the foregoing embodiments.

BRIEF DESCRIPTION OF DRAWINGS

The accompanying drawings are not necessarily drawn to scale. For the purposes of clarity, not every component may be labeled in every drawing. In the drawings.

DETAILED DESCRIPTION

Figure 1:
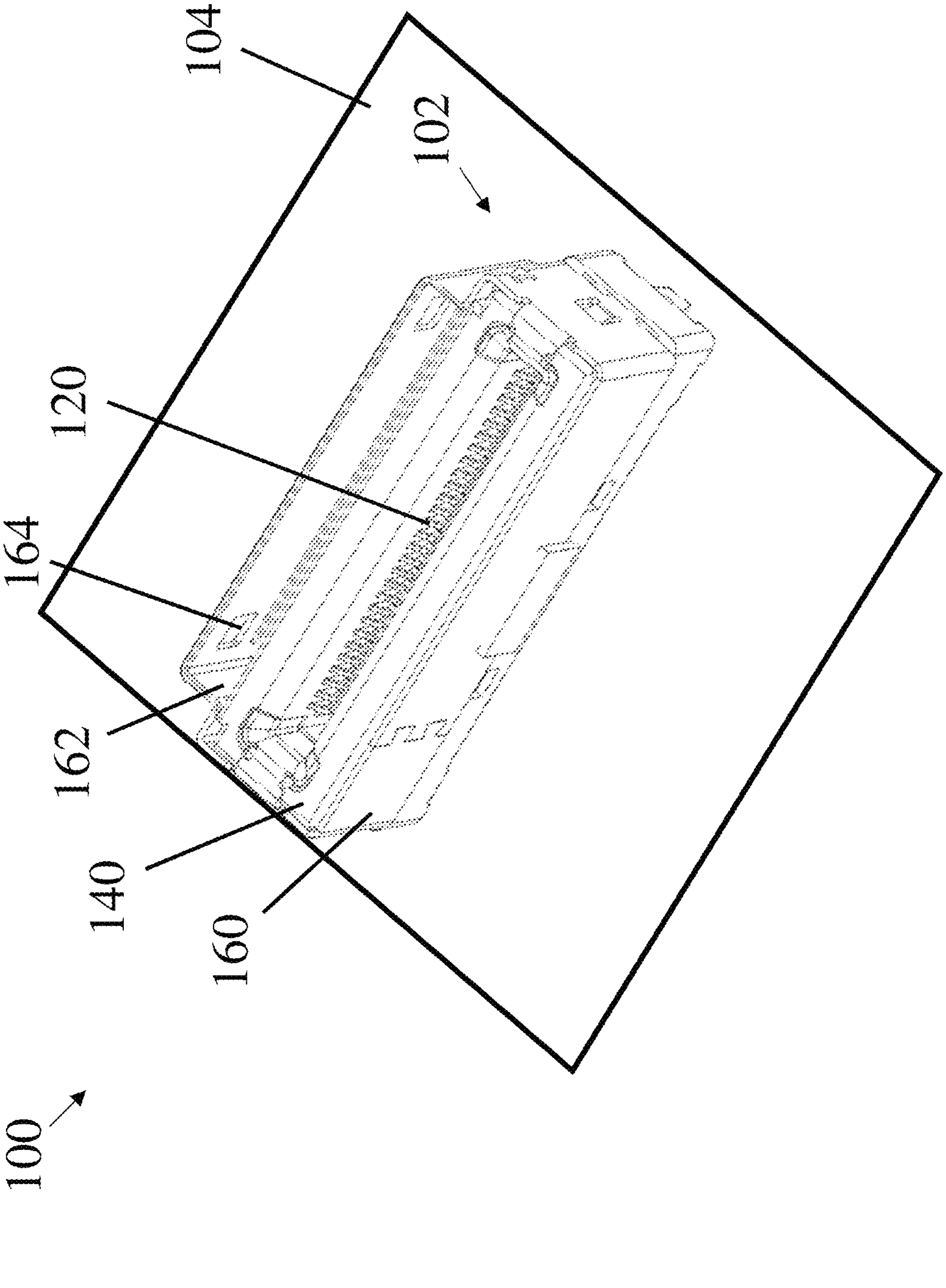
FIG. 1 is a perspective view of a portion of an electronic assembly, including a receptacle connector in accordance with some embodiments of the present disclosure.

The inventors have recognized and appreciated design techniques for electrical connectors that enable mated plug and receptacle connectors to occupy a small volume while providing reliable operation for high integrity signal interconnects. Techniques as described herein may lead to compact, but robust connectors, less likely to be damaged during mating.

The inventors have recognized and appreciated that, when a user seeks to insert a plug connector into a receptacle connector, improper orientation of the plug or misalignment between the plug and receptacle can lead to a user placing a large amount of force on the receptacle connector as the user seeks to force the plug and receptacle into a mated positioned. For example, an engagement portion of the plug connector, may be incorrectly inserted into a receiving portion of the receptacle connector, potentially causing damage to the receptacle connector. In cases of a user attempting to insert a misaligned plug, portions of the insulative housing of the receptacle connector bounding the receiving portion may be subject to a large force, such as up to 55 N. For miniaturized electrical connectors, the force may be sufficient to deform or break the insulative housing of the receptacle connector. The receptacle connector may then cease to reliably hold the plug, creating the possibility of intermittent connection between the plug and receptacle so that the connector loses its function, which in turn affects the normal operation of the electronic device containing the connector.

Techniques as described herein may enable robust, miniaturized connectors by reducing the impact of such forces, thereby limiting the resulting damage. Miniaturized connectors described herein may have a width of less than 8 mm or less than 7 mm, in some embodiments, such as between 6 and 7 mm, such as 6.82 mm, as one example. Such connectors may have a pitch of approximately 0.6 mm between adjacent electrical contacts.

One such technique is the incorporation of one or more tabs at an edge of the receiving portion and disposed over portions of the insulative member. The tabs may extend from an electrically conductive shell that is otherwise included as part of the connector to suppress electromagnetic interference and/or to provide latching. Incorporation of such tabs may be done with a simple manufacturing operation, as manufacturing operations to incorporate the electrically conductive shell would be performed as part of the manufacturing a connector even without tabs. Separate components are not necessary. Moreover, positioning the tabs to bound surfaces of the slots does not require insertion of components into the housing, as the conductive shell is mounted to the exterior of the housing. Further, such tabs may be used with housings even with thin end walls, such that techniques as described herein are well suited for miniaturized connectors.

The tabs may be sized and shaped to distribute force over a larger area of the insulative housing than were an edge of the engagement portion of the plug connector to press against the insulative housing directly. For example, the tabs may include folded portions of the conductive shell of the receptacle connector. Straight portions of the tabs may extend into the receiving portion parallel to walls thereof with tapered portions folded over an opening of the receiving slot. Connecting portions may connect the tabs with the main body of the conductive shell. The straight portions may distribute the force over portions of the insulative housing bounding the receiving portion, which reduces the pressure at any location. The tapered portions of the tabs may also guide the engagement portion of the plug into the receiving portion of the receptacle, which also reduces the risk of damage to the insulative housing of the receptacle.

Recessed portions may be formed in the insulative housing with shapes corresponding to portions of the tabs such that the tabs are received in the recessed portions. For example, the recessed portions may include straight portions shaped to receive the straight portions of the tabs and tapered portions shaped to receive the tapered portions of the tabs. In some embodiments, the recessed portions of the receptacle housing may include outer portions shaped to receive the connecting portions of the tabs. With the tabs recessed into the insulative housing, an edge of the tabs may abut a wall of the recess, such that an outward force, exerted by the tab on the wall of the insulative housing, will be distributed over the edge of the tab. As the edge of the tab may be longer than the width of the receiving portion, the edge of the tab may be recessed into portions of the insulative housing that are not aligned with the receiving portion. Portions of the housing that are not aligned with the receiving portion may be thicker, and therefore stronger, than the portions adjacent the receiving portion such that distributing force over the edge of the tab may result in that force being countered by the mechanically more robust portions of the housing. In some embodiments, the tabs may be flush with the insulative housing of the connector such that the tabs do not extend substantially above the surface of the insulative housing.

Figure 2:
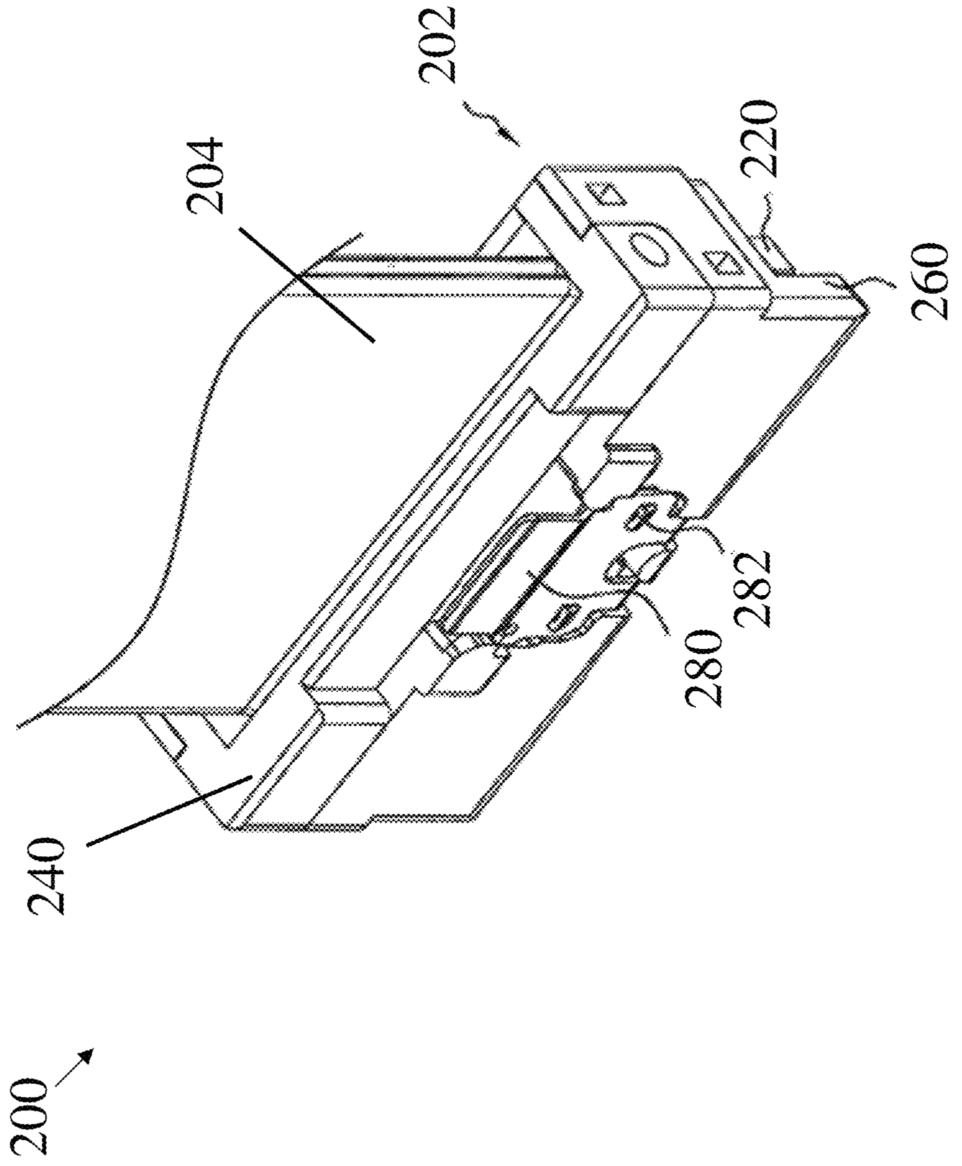
FIG. 2 is a perspective view of cable assembly, including a plug connector in accordance with some embodiments of the present disclosure.

Turning to the figures, FIGS. 1-2 illustrate electrical connectors that may be used in an electrical interconnect system in accordance with some embodiments of the present disclosure.

FIG. 1 is a perspective view of an embodiment of an electronic assembly 100. In the illustrative embodiment of FIG. 1, electronic assembly 100 includes electrical connector 102 mounted to substrate 106. Substrate 106 may be a PCB that forms a portion of an electronic system. For simplicity, only a portion of substrate 106 is shown, but such a substrate may contain electronic components. Similarly, other printed circuit boards or other components of the electronic system to which components on substrate 106 may be connected are not expressly illustrated. However, it should be recognized that an electronic system may include, for example, a second substrate that may be connected to substrate 106 via a cable assembly terminated with a plug connector that mates with connector 102.

Substrate 106 may have pads or holes to which tail ends of electrical contacts 120 may be mechanically and electrically connected. Thus, electrical contacts 120 of electrical connector 102 may be in electrical connection with substrate 106. Connector 102 may include one or more board locks or other extending portions that engage openings in substrate 106 to position and/or secure connector 102 to substrate 106.

While electronic assembly 100 is illustrated with a vertically oriented connector mounted to a substrate, it should be appreciated that an electrical connector using techniques as described herein may be mounted in other orientations, such as at a right angle with respect to substrate 106. A connector may also be mounted in other locations on substrate 106, for example at an edge of substrate 106.

In the illustrative embodiment of FIG. 1, electrical connector 102 includes electrical contacts 120, an insulative housing, and conductive shell 160. Electrical connector 102 is here shown configured as a receptacle connector. The insulative housing may be implemented with one or more components, but is here shown implemented with insulative member 140. Insulative member 140 has a receiving portion configured as a slot. Electrical contacts 120 are seated within the slot with mating portions of electrical contacts 120 exposed within the slot so as to make electrical connection with terminals on an engagement portion of a plug connector inserted in the slot.

Contact tails of electrical contacts 120 may extend from a surface of insulative member 140 facing substrate 106. In the illustrated embodiment, the contact tails are shaped as surface mount tails that are soldered to pads on a surface of substrate 106. Electrical contacts 120 are illustrated within electrical terminal assemblies, as described herein including in connection with FIG. 6

In the illustrated embodiment, connector 102 has a metal shell that may provide shielding around electrical contacts 120. Here, conductive shell 160 is disposed around insulative member 140. In the illustrative embodiment of FIG. 1, conductive shell 160 includes receiving space 162 configured to receive a retaining member of a mating electrical connector. For example, openings 164 of receiving space 162 may be sized and positioned to engage projections on an attachment mechanism of the retaining member. However, it should be appreciated that some embodiments do not include receiving space 162. Electrical connector 102 and components thereof are described further herein including in connection with FIGS. 3-6.

FIG. 2 is a perspective view of a portion of an exemplary cable assembly 200. In the illustrative embodiment of FIG. 2, cable assembly 200 includes a plug connector terminating a cable, here shown as electrical connector 202 and electrical cable 204.

Electrical connector 202 is here configured as a plug connector with an engagement portion such as may be inserted into a slot of a receptacle connector in use. The engagement portion may be a paddle card, which may have multiple pads that are positioned to mate with electrical contacts, such as electrical contacts 120, within a slot of a receptacle connector. Electrical conductors within electrical cable 204 may be mounted to the paddle card within electrical connector 202.

In the illustrative embodiment of FIG. 2, electrical connector 202 includes paddle card 220, electrically insulative portion 240, tongue 260, and attachment mechanism 280.

Paddle card 220 may be configured for inserting into a receiving slot of a complementary electrical connector, with conductive traces on paddle card 220 exposed for mating with electrical contacts along the walls of the receiving slot of the complementary electrical connector. Electrically insulative portion 240 serves as a connector housing that holds paddle card 220 with an exposed portion to enable mating with a complementary electrical connector.

Tongue 260 is configured for engaging with a receiving space in the complementary electrical connector. Tongue 260 may be formed integrally with electrically insulative portion 240, or may be formed separately and attached. For a receptacle connector as shown in FIG. 1, with a receiving space on only one side of the connector, tongue 260 may be shaped so that the plug can only be inserted into the receptacle connector in one orientation. However, if a user attempts to insert the plug into the receptacle connector with an improper orientation, a large force may be applied to the receptacle connector.

A plug connector, such as connector 202 may have features that latch to complementary features on a receptacle connector. In the example of FIG. 2, latching is provided by attachment mechanism 280. Attachment mechanism has projections 282, which may be configured to engage openings in a conductive shell of the complementary electrical connector. For example, openings 164 are shown for latching in the embodiment of FIG. 1.

It should be appreciated that electrical connector 202 as illustrated in FIG. 2 is not configured for mating with electrical connector 102 as illustrated in FIG. 1. Electrical connectors 102 and 202 have exemplary configurations, and electrical connector 202 may be configured for mating with electrical connector 102. For example, openings 164 illustrated in FIG. 1 may be positioned to align with projections 282. Likewise, paddle card 220 may be configured to fit into a receiving slot of electrical connector 102, with traces thereon configured for coupling to electrical contacts 120. The space between electrically insulative portion 240 and paddle card 220 may be configured to receive insulative member 140. Additionally, tongue 260 may be configured for inserting into receiving space 162. Thus, a plug connector, with features as shown on electrical connector 202, may be configured for mating with electrical connector 102.

FIGS. 3-6 illustrate the receptacle connector of FIG. 1, as well as various components thereof, in accordance with some embodiments of the present disclosure.

Figure 3:
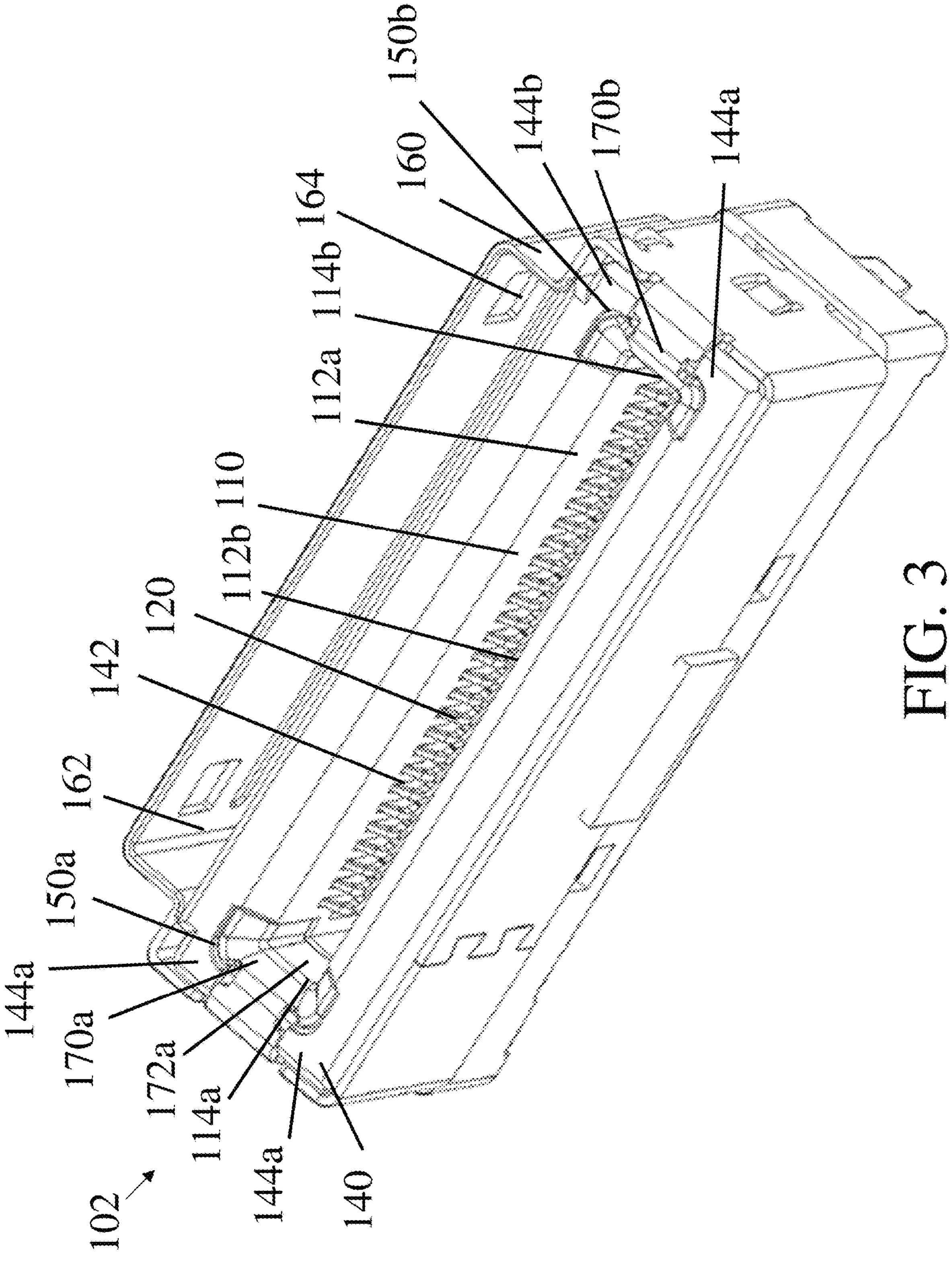
FIG. 3 is a perspective view of a receptacle connector, in accordance with some embodiments of the present disclosure.

FIG. 3 is a perspective view of receptacle connector 102 of the embodiment illustrated in FIG. 1. In the illustrative embodiment of FIG. 3, receptacle connector 102 includes slot 110, electrical contacts 120, insulative member 140, and conductive shell 160. Slot 110 is bounded by insulative member 140 and conductive shell 160. It should be appreciated that slot 110 may be partially or entirely bounded by insulative member 140 and conductive shell 160.

In the illustrative embodiment of FIG. 3, slot 110 includes side walls 112*a* and 112*b*, and end walls 114*a* and 114*b*. Side walls 112*a* and 112*b* may have lengths extending parallel to a direction along which end walls 114*a* and 114*b* are spaced from one another, and end walls 114*a* and 114*b* may have lengths extending in a direction parallel to a direction along which side walls 112*a* and 112*b* are spaced from one another. Slot 110 may be shaped to receive an engagement portion of a mating electrical connector, such as paddle card 220 illustrated in FIG. 2, with sides of the engagement portion having pads aligned with side walls 112*a* and 112*b*, and with edges of the engagement portion aligned with end walls 114*a* and 114*b*. Accordingly, side walls 112*a* and 112*b* may be longer than end walls 114*a* and 114*b*. Thus, slot 110 forms a portion of a mating interface of receptacle connector 102. As shown in FIG. 3, side walls 112*a* and 112*b* are longer than end walls 114*a* and 114*b*.

In the illustrative embodiment of FIG. 3, electrical contacts 120 are disposed along side walls 112*a* and 112*b* of slot 110, with side walls 112*a* and 112*b* being parallel and opposite each other. Mating ends of electrical contacts 120 are elongated in a mating direction with contact surfaces positioned towards an opening of slot 110, and are thus configured to engage with a complementary electrical connector when received in slot 110.

In the illustrative embodiment of FIG. 3, electrical contacts 120 have distal tips that extend into channels 142 of insulative member 140 along side walls 112*a* and 112*b*. Insulative member 140 may electrically insulate electrical contacts 120 and conductive shell 160 from one another. For example, insulative member 140 may include a dielectric material such as plastic.

Insulative member 140 is illustrated as bounded by conductive shell 160. Insulative member 140 may be partially or entirely bounded by conductive shell 160. For example, in some embodiments, conductive shell 160 may bound at least three sides of insulative member 140. Conductive shell 160 may be configured to provide electromagnetic shielding around receptacle connector 102 to limit electromagnetic interference (EMI) between receptacle connector 102 and adjacent electrical connectors and/or other electronic devices. Conductive shell 160 is shaped to leave receiving space 162 between conductive shell 160 and insulative member 140. For example, receiving space 162 may be configured to receive a retaining member of a mating electrical connector. Openings 164 of receiving space 162 may be sized and positioned to engage projections on an attachment mechanism of the retaining member. In this example, receiving space 162 is positioned on a same side of slot 110 as side wall 112*a*. Thus, receiving space 162 is configured to receive a retaining member on the side of slot 110 of side wall 112*a*. Accordingly, the mating electrical connector having the retaining member can only be inserted into the receptacle connector in one orientation, namely with the retaining member on the side of side wall 112*a*. However, if a user attempts to insert the mating electrical connector into the receptacle connector with an improper orientation, such as on the side of side wall 112*b*, a large force may be applied to the receptacle connector.

In the illustrative embodiment of FIG. 3, conductive shell 160 includes tabs 170*a* and 170*b* disposed in recessed portions 150*a* and 150*b* of insulative member 140 along end walls 114*a* and 114*b*. Tabs 170*a* and 170*b* are also at least partially disposed along side walls 112*a* and 112*b*. Tabs 170*a* and 170*b* are wide enough to extend beyond slot 110 adjacent the side walls 112*a* and 112*b* such that they can be recessed into those sidewalls.

The inventors have recognized and appreciated that end walls 114*a* and 114*b*, particularly portions of those walls that are aligned with slot 110, are susceptible to damage from insertion of a misaligned plug in a miniaturized connector. Tabs 170*a* and 170*b* resist damage to the connector by providing structural reinforcement for those portions of receptacle connector 102. Tabs 170*a* and 170*b* also may guide an engagement portion of a mating electrical connector into slot 110, thereby protecting against damage caused by incorrect insertion.

When force from insertion of a plug is applied to tabs 170*a* and 170*b*, tabs 170*a* and 170*b* may transfer some of the force exerted thereon to insulative member 140 via recessed portions 150*a* and 150*b*. Tabs 170*a* and 170*b* may transfer force to insulative member 140 over a larger area than if an incorrectly inserted component directly contacted insulative member 140. For example, straight portions 172*a* and 172*b* of tabs 170*a* and 170*b* extend along end walls 114*a* and 114*b* parallel to the direction of insertion so as to distribute the force deeper into slot 110 along the direction of insertion than where an incorrectly inserted component may directly make contact. Straight portions 172*a* and 172*b* are described further herein including in connection with FIG. 4. Additionally, tabs 170*a* and 170*b* extend beyond end walls 114*a* and 114*b* in a direction along which side walls 112*a* and 112*b* are spaced from one another, and thus will press against body portions 144*a* and 144*b* of insulative member 140, so as to distribute the force thereon, as described herein including in connection with FIG. 5.

Figure 4:
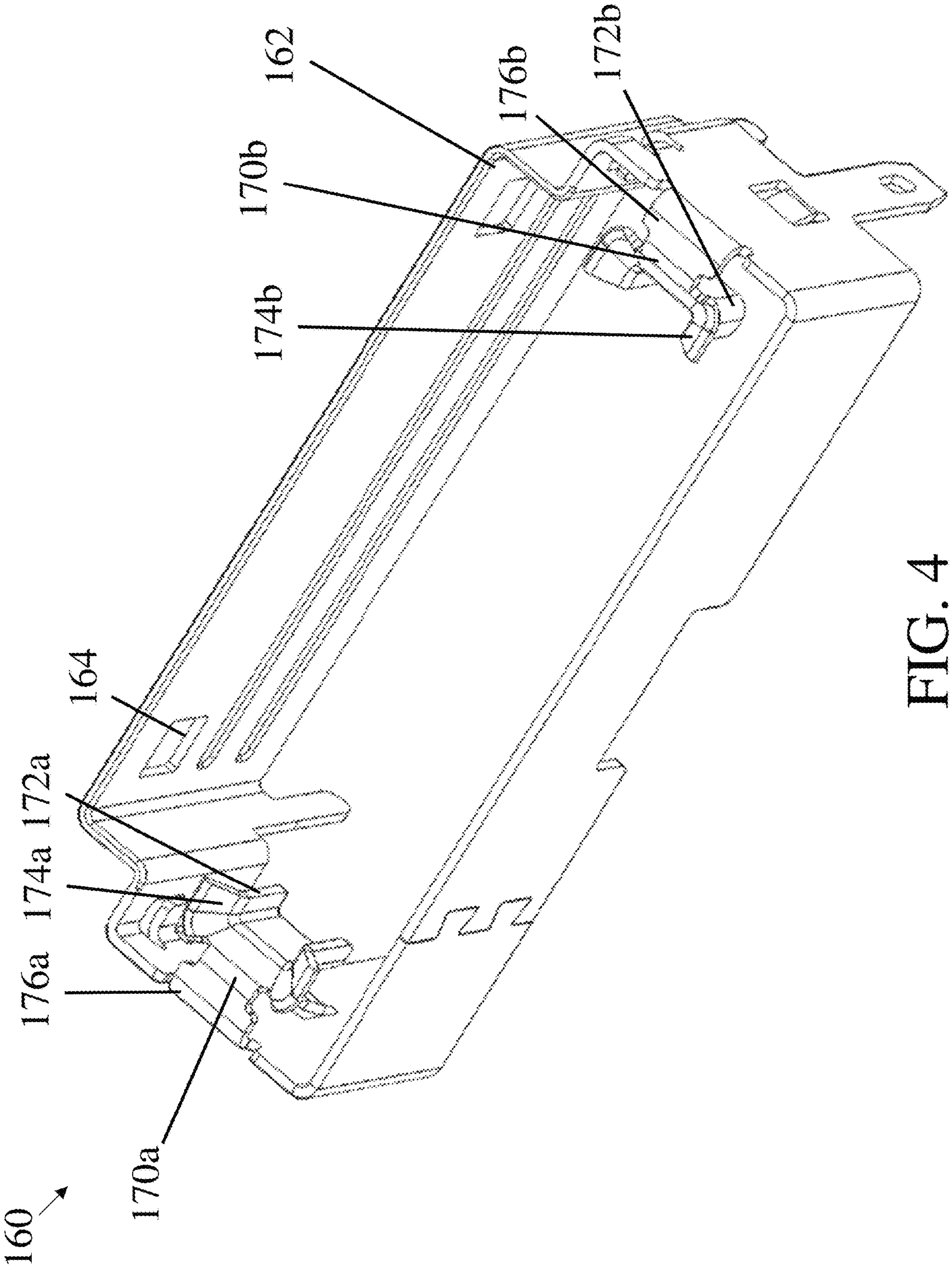
FIG. 4 is a perspective view of the conductive shell of the receptacle connector of FIG. 3.

FIG. 4 is a perspective view of conductive shell 160 of the embodiment illustrated in FIG. 1. In the illustrative embodiment of FIG. 4, tabs 170*a* and 170*b* of conductive shell 160 include straight portions 172*a* and 172*b*, tapered portions 174*a* and 174*b*, and connecting portions 176*a* and 176*b*. Straight portions 172*a* and 172*b* extend along end walls 114*a* and 114*b* of slot 110 in a direction parallel to the mating direction. Tapered portions 174*a* and 174*b* extend between connecting portions 176*a* and 176*b* and straight portions 172*a* and 172*b*. Connecting portions 176*a* and 176*b* connect tapered portions 174*a* and 174*b* to a main body of conductive shell 160.

Conductive shell 160 may be formed by stamping and folding a metal sheet to form a space into which insulative member 140 may be inserted. Tabs 170*a* and 170*b* may be formed integrally to conductive shell 60. For example, tabs 170*a* and 170*b* may be stamped and folded from a same metal sheet as conductive shell 160. Alternatively, tabs 170*a* and 170*b* may be formed separately, such as by stamping and folding another metal sheet, and may be attached to conductive shell 160, such as by welding or bonding.

Straight portions of tabs 170*a* and 170*b* extend into slot 110 parallel to the mating direction, such that force exerted on receptacle connector 102 by an incorrectly inserted engagement portion may be distributed to portions of slot 110 deeper along the direction of insertion than portions that make contact with the engagement portion. For example, the engagement portion may exert a force on tapered portions 174*a* and 174*b*, such as at a mating edge of slot 110, but not on portions of slot 110 beyond the mating edge in the direction of insertion. Straight portions 172*a* and 172*b* extend beyond the opening in the direction of insertion so as to distribute the force to the portions of slot 110 not contacted by the engagement portion. The inventors have recognized and appreciated that by distributing the force over a larger portion of insulative member 140, the pressure exerted on portions of insulative member 140 may be eased, thus reducing the risk of damage receptacle connector 102 when the engagement portion is inserted incorrectly.

Connecting portions 176*a* and 176*b* extend substantially perpendicular to straight portions 172*a* and 172*b*. For example, connecting portions 176*a* and 176*b* may extend substantially parallel to a direction along which end walls 114*a* and 114*b* are spaced from one another.

Tapered portions 174*a* and 174*b* may be configured to guide an engagement portion of a plug connector into slot 110. For example, the engagement portion may be inserted with a correct orientation but into an incorrect position, such that an edge of the engagement portion contacts one of tapered portions 174*a* and 174*b* rather than sliding along a wall of slot 110. Tapered portion 174*a* follows a tapering of slot 110, as slot 110 is progressively narrowed along the direction of insertion of the engagement portion. Accordingly, the engagement portion may slide along tapered portion 174*a* or 174*b* and into slot 110. The inventors have recognized and appreciated that tapered portions 174*a* and 174*b* configured to guide an engagement portion of a plug connector may reduce the risk of damage to receptacle connector 102 when the engagement portion is incorrectly inserted into receptacle connector 102.

Figure 5:
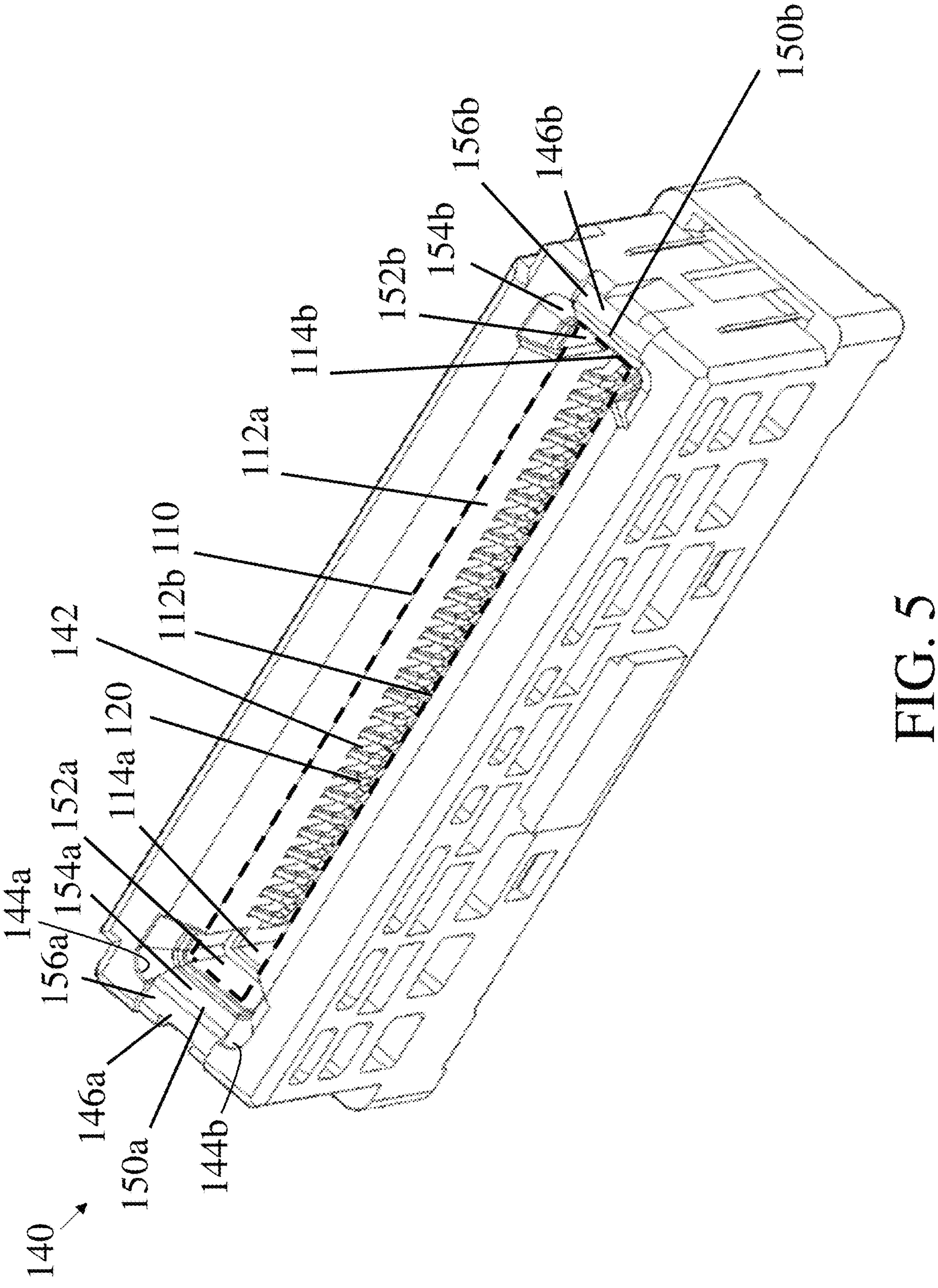
FIG. 5 is a perspective view of an insulative member of the receptacle connector of FIG. 3.

FIG. 5 is a perspective view of insulative member 140 of the embodiment illustrated in FIG. 1. In the illustrative embodiment of FIG. 5, insulative member 140 is disposed around slot 110 having electrical contacts 120 seated in channels 142 along side walls 112*a* and 114*a*. Recessed portions 130*a* and 130*b* are disposed along end walls 114*a* and 114*b*, and are also at least partially disposed along side walls 112*a* and 112*b*. Body portions 144*a* and 144*b* of insulative member 140 extend parallel to side walls 112*a* and 112*b*. Connecting portions 146*a* and 146*b* connecting body portions 144*a* and 144*b* extend parallel to end walls 114*a* and 114*b*.

Insulative member 140 may be formed of a single body, or alternatively may be formed from multiple combined portions. For example, insulative member 140 may be formed in a single molding operation, or in multiple molding operations, such as for molding each of body portions 144*a* and 144*b* and connecting portions 146*a* and 146*b*.

Recessed portions 130*a* and 130*b* may be shaped to receive tabs 170*a* and 170*b* of conductive shell 160, as illustrated in FIG. 4. For example, in the illustrative embodiment of FIG. 5, recessed portions 130*a* and 130*b* include straight portions 132*a* and 132*b*, tapered portions 134*a* and 134*b* and outer portions 136*a* and 136*b*. Straight portions 132*a* and 132*b* may be shaped to receive straight portions 172*a* and 172*b*, tapered portions 134*a* and 134*b* may be shaped to receive tapered portions 174*a* and 174*b*. In some embodiments, outer portions 136*a* and 136*b* may be shaped to receive connecting portions 176*a* and 176*b*.

The inventors have recognized and appreciated that, when tabs 170*a* and 170*b* and recessed portions 130*a* and 130*b* extend beyond end walls 114*a* and 114*b* in a direction parallel to the direction in which side walls 112*a* and 112*b* are spaced, force exerted on tabs 170*a* and 170*b* by an engagement portion of a plug connector may be distributed to portions of insulative member 140 which are stronger than the portions which may contact the engagement portions. For example, straight portions 172*a* and 172*b* and tapered portions 174*a* and 174*b* of tabs 170*a* and 170*b* (and also of recessed portions 130*a* and 130*b*) may extend beyond connecting portions 146*a* and 146*b* to body portions 144*a* and 144*b*. Body portions 144*a* and 144*b* are integral with side walls 112*a* and 112*b* and are thicker than connecting portions 146*a* and 146*b*, which are integral with end walls 114*a* and 114*b*. For example, in some embodiments, body portions 144*a* and 144*b* may be at least 50% thicker than connecting portions 146*a* and 146*b*. Thus, body portions 144*a* and 144*b* are better able to absorb force without breaking than connecting portions 146*a* and 146*b*. By distributing the force to body portions 144*a* and 144*b*, tabs 170*a* and 170*b* may reduce an impact of the force on receptacle connector 102 and reduce the risk of damage thereto when the engagement portion is inserted incorrectly.

Figure 6:
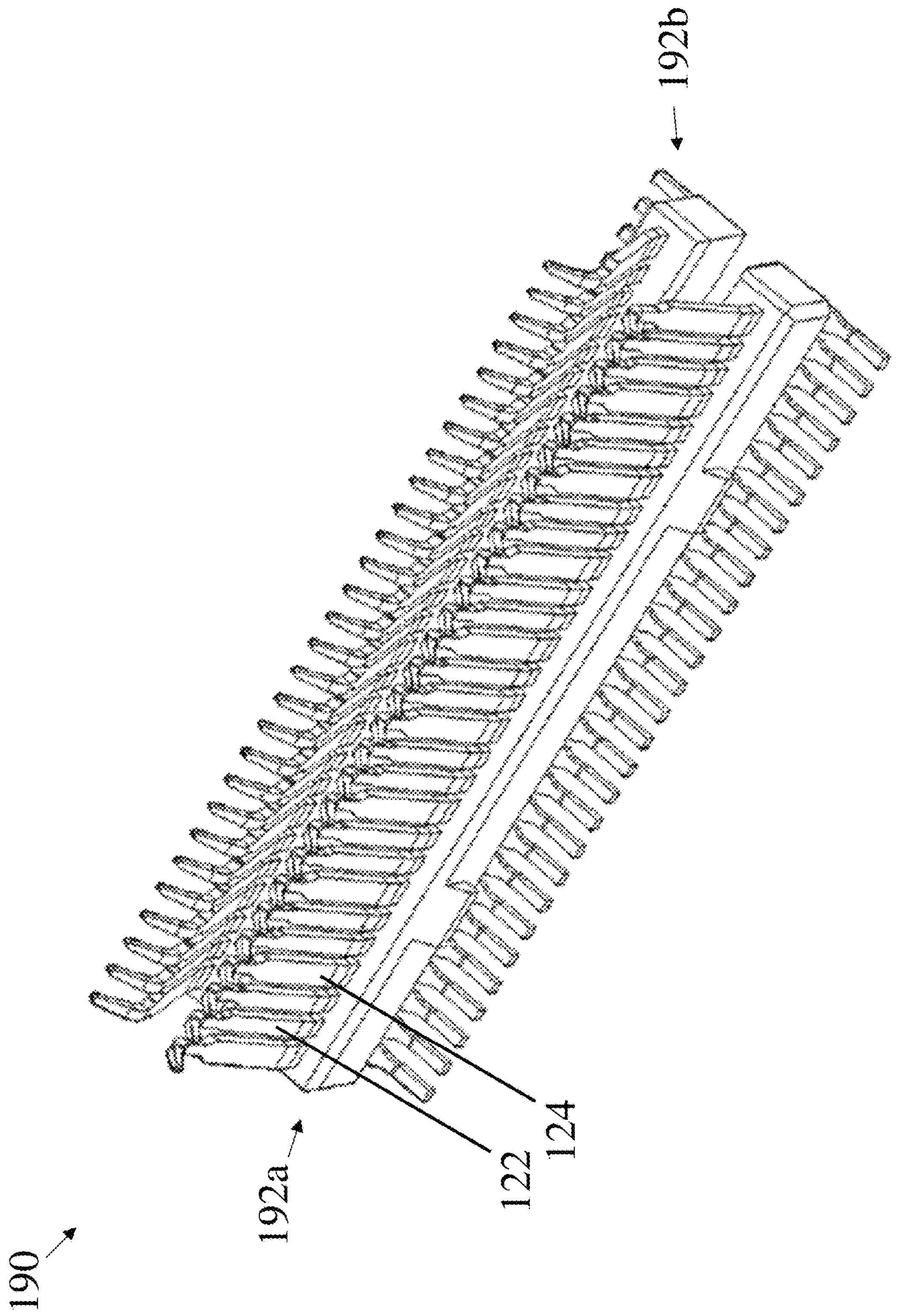
FIG. 6 is a perspective view of an electrical terminal assembly of the receptacle connector of FIG. 3.

FIG. 6 is a perspective view of electrical terminal assembly 190 of the embodiment illustrated in FIG. 1. In the illustrative embodiment of FIG. 6, electrical terminal assembly 190 includes first terminal subassembly 192*a* and second terminal subassembly 192*b*. In some embodiments, first and second terminal subassemblies 192_a_ and 192_b_ may be substantially identical, such that a single type of terminal subassembly may be manufactured, and two or more such subassemblies may be used in the connector, which reduces the part count in the connector and lowers production cost. It should be appreciated that, in some embodiments, terminal subassemblies 192_a_ and 192_b_ may have variations. For example, in a right angle connector, terminal subassemblies 192_a_ and 192_b_ may be shaped so as to nest one inside the other.

In the illustrative embodiment of FIG. 6, first and second terminal subassemblies 192_a_ and 192_b_ have arrays of electrical contacts 120 including signal contacts 122 and ground contacts 124. Signal contacts 122 and ground contacts 124 are illustrated as supported by leadframe housings. For example, the leadframe housing may be formed at least partially of an insulative material molded around the electrical contacts. Signal contacts 620 are illustrated as differential pairs positioned between ground contacts 124 in a Ground-Signal-Signal-Ground pattern. It should be appreciated that signal contacts 122 may be configured as single ended signal contacts. For example, in some embodiments, signal contacts 122 and ground contacts 124 may be positioned in a Ground-Signal-Ground pattern. Signal contacts 122 are illustrated as having a different shape from ground contacts 124. For example, ground contacts 124 may be wider than signal contacts 122. Signal contacts 122 and ground contacts 124 may be compliant. For example, signal contacts 122 and ground contacts 124 may be inserted into insulative member 140 and configured to compress against walls of slot 110 when mated with a complementary electrical connector.

The disclosed technology is not limited in its application to the details of construction and the arrangement of components set forth in the following description or illustrated in the drawings. The disclosed technology is capable of other embodiments and of being practiced or of being carried out in various ways. Also, the phraseology and terminology used herein is for the purpose of description and should not be regarded as limiting. The use of "including," "comprising," "having," "containing," or "involving," and variations thereof herein, is meant to encompass the items listed thereafter and equivalents thereof as well as additional items.

Having thus described at least one illustrative embodiment of the invention, various alterations, modifications and improvements will readily occur to those skilled in the art.

For example, techniques as described herein may be applied to receptacle connectors configured according to any suitable standard, including, for example, SAS, mini-SAS, or mini-SAS HD. In some embodiments, side walls 112_a_ and 112_b_ of slot 110 may be more than 7 times as long as end walls 114_a_ and 114_b_. In some embodiments, side walls 112_a_ and 112_b_ may be approximately 7.65 mm long between end walls 114_a_ and 114_b_, and end walls 114_a_ and 114_b_ may be approximately 1 mm long between side walls 112_a_ and 112_b_.

As another example, an electronic system was described in which a receptacle is mounted to a printed circuit board and a plug connector terminates a cable assembly. These mounting configurations are illustrative rather than limiting. A connector configured as a receptacle could terminate a cable assembly and a connector configured as a plug could be mounted to a printed circuit board. As another variation, both plug and receptacle could be mounted to a printed circuit board or both could terminate cables.

As another example, in some embodiments, slot 110 may include one or more dividing walls positioned therein so as to form multiple openings of slot 110. A complimentary electrical connector may include separate engagement components such as paddle cards, and/or multiple engagement portions of the paddle card(s), such that the engagement components or engagement portions are configured to occupy the multiple openings of slot 110. Additionally, slot 110 be bounded on at least three sides by insulative member 140 and/or conductive shell 160.

As another example, in some embodiments, tabs 170_a_ and 170_b_ are only positioned along end walls 114_a_ and 114_b_ of slot 110. In some embodiments, tabs 170_a_ and 170_b_ do not include straight portions 172_a_ and 172_b_, instead terminating at tapered portions 174_a_ and 174_b_.

As another example, in some embodiments, recessed portions 130_a_ and 130_b_ may only be shaped to receive straight portions 172_a_ and 172_b_ and tapered portions 174_a_ and 174_b_. For instance, some embodiments do not include outer portions 136_a_ and 136_b_ of recessed portions 130_a_ and 130_b_. In some embodiments, only connecting portions 176_a_ and 176_b_ and tapered portions 174_a_ and 174_b_ may be received in recessed portions 130_a_ and 130_b_. For instance, some embodiments do not include straight portions 172_a_ and 172_b_ of tabs 170_a_ and 170_b_.

As another example, in some embodiments, recessed portions 130_a_ and 130_b_ may be shaped such that, when tabs 170_a_ and 170_b_ are disposed therein, surfaces of tabs 170_a_ and 170_b_ are substantially flush with surfaces of side walls 112_a_ and 112_b_ and end walls 114_a_ and 114_b_. For example, a first portion of side wall 112_a_ may include straight portion 152_a_ of recessed portion 130_a_ in which straight portion 172_a_ is disposed. A second portion of side wall 112_a_ may not be recessed, such as a portion of side wall 112_a_ between tabs 170_a_ and 170_b_. Without tab 170_a_, a surface of the first portion is spaced farther from side wall 112_b_ than a surface of the second portion is. However, when tab 170_a_ is disposed in recessed portion 130_a_, surfaces of tab 170_a_ and of the second portion may be spaced substantially equally from side wall 112_b_. For example, a surface of tab 170_a_ facing side wall 112_b_ may be spaced from side wall 112_b_ by an amount within 5% of an amount a surface of the second portion facing side wall 112_b_ is spaced from side wall 112_b_. In some embodiments, portions of tabs 170_a_ and 170_b_ along side wall 112_a_ may be disposed no closer to side wall 112_b_ than side wall 112_a_ is. It should be appreciated that portions of tabs 170_a_ and 170_b_ along other walls of slot 110, such as side wall 112_b_, or end walls 114_a_ and 114_b_ may be similarly positioned to as described herein regarding portions along side wall 112_a_.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles “a” and “an,” as used herein in the specification and in the claims, unless clearly indicated to the contrary, should be understood to mean “at least one.”

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified.

As used herein in the specification and in the claims, the phrase “equal” or “the same” in reference to two values (e.g., distances, widths, etc.) means that two values are the same within manufacturing tolerances. Thus, two values being equal, or the same, may mean that the two values are different from one another by ±5%.

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of,” or “exactly one of.” “Consisting essentially of,” when used in the claims, shall have its ordinary meaning as used in the field of patent law.

Also, the phraseology and terminology used herein is for the purpose of description and should not be regarded as limiting. The use of “including,” “comprising,” or “having,” “containing,” “involving,” and variations thereof herein, is meant to encompass the items listed thereafter and equivalents thereof as well as additional items.

What is claimed is:

1. An electrical connector, comprising:

an insulative member supporting a plurality of electrical contacts and comprising a recessed portion; and a conductive shell at least partially bounding the plurality of electrical contacts and the insulative member, the conductive shell comprising:

- a body comprising a wall; and
- a first tab integral with the wall of the body and comprising:
  - a first portion at least partially disposed in the recessed portion of the insulative member and having a first width in a first direction parallel to the wall of the body; and
  - a second portion at least partially disposed in the recessed portion of the insulative member and having a second width in the first direction, wherein:
  - the first portion connects the second portion to the wall of the body,
  - the first width is wider than the second width in the first direction,
  - the insulative member comprises a first insulative wall opposite a second insulative wall in the first direction,
  - the recessed portion has a first end at the first insulative wall and a second end at the second insulative wall, and
  - the second width of the second portion of the first tab runs at least from the first end of the recessed portion to the second end of the recessed portion.

2. The electrical connector of claim 1, wherein:

the first tab is bent from the wall of the body about a first axis; and the first direction is parallel to the first axis.

3. The electrical connector of claim 1, wherein:

the insulative member is configured to receive a paddle card of a mating electrical connector inserted in a mating direction perpendicular to the first direction; and the first tab is elongated parallel to the mating direction.

4. The electrical connector of claim 1, wherein:

the conductive shell further comprises a second tab integral with the body and bent so as to be at least partially disposed in a second recessed portion of the insulative member, the second tab comprising:

- a third portion having a third width in the first direction; and
- a fourth portion having a fourth width in the first direction;

the third portion connects the fourth portion to the body; and the third width is wider than the fourth width.

5. The electrical connector of claim 4, wherein:

the plurality of electrical contacts are positioned in a row along a row direction; and the first tab is spaced from the second tab along the row direction.

6. The electrical connector of claim 1, wherein the first tab further comprises a third portion connecting the first portion to the body.

7. The electrical connector of claim 1, wherein:
the insulative member comprises a slot configured to receive a paddle card; and
the plurality of electrical contacts are disposed along at least one wall of the slot.

8. The electrical connector of claim 1, wherein the conductive shell comprises a receiving space configured to receive a retaining member.

9. The electrical connector of claim 8, wherein the conductive shell further comprises openings configured to engage projections on an attachment mechanism of the retaining member.

10. The electrical connector of claim 1, wherein:
the electrical connector is oriented to receive a mating electrical connector inserted in a mating direction perpendicular to the first direction;
the insulative member comprises a surface disposed at least partially around the recessed portion and facing in a direction opposite the mating direction; and
at least from the body to the second portion, the first tab is offset from the surface of the insulative member in the mating direction.

11. An electrical connector, comprising:
an insulative member comprising:
a plurality of insulative walls, comprising:
a first pair of opposing insulative walls;
a second pair of opposing insulative walls connecting the first pair of opposing insulative walls to bound a slot that includes a first opening and a second opening; and
a dividing wall separating the first opening from the second opening,
a first tab receiving space; and
a second tab receiving space, wherein:
a first insulative wall of the first pair of opposing insulative walls at least partially bounds the first opening of the slot and at least partially bounds the first tab receiving space, and
a second insulative wall of the first pair of opposing insulative walls at least partially bounds the second opening of the slot and at least partially bounds the second tab receiving space;
a plurality of electrical contacts held within the insulative member in the first and second openings of the slot; and
a conductive shell disposed around the insulative member, the conductive shell comprising:
a body comprising a plurality of conductive walls, each of the plurality of conductive walls parallel to an insulative wall of the plurality of insulative walls;
a first tab and a second tab, each of the first tab and the second tab integral with and extending from the body of the conductive shell and comprising:
a first portion extending from and bent with respect to a conductive wall of the plurality of conductive walls; and
a second portion extending from and bent with respect to the first portion, the second portion extending into a respective tab receiving space of the first tab receiving space and the second tab receiving space.

12. The electrical connector of claim 11, wherein:
the first tab is bent from the body about a first axis;
the second tab is bent from the body about a second axis that is parallel to the first axis.

13. The electrical connector of claim 11, wherein:
the first opening is configured to receive a first engagement portion of at least one paddle card of a mating electrical connector inserted in a mating direction; and
the second opening is configured to receive a second engagement portion of the at least one paddle card of the mating electrical connector inserted in the mating direction.

14. The electrical connector of claim 13, wherein:
at least a first portion of the first tab is disposed in the first tab receiving space and elongated parallel to the mating direction; and
at least a second portion of the second tab is disposed in the second tab receiving space and elongated parallel to the mating direction.

15. The electrical connector of claim 11, wherein:
the plurality of electrical contacts are positioned in a row along a row direction; and
the first tab is spaced from the second tab along the row direction.

16. The electrical connector of claim 15, wherein:
the first tab is positioned proximate a first end of the row of the plurality of electrical contacts; and
the second tab is positioned proximate a second end of the row of the plurality of electrical contacts.

17. An electrical connector, comprising:
an insulative member comprising a first pair of opposing insulative walls and a third insulative wall connecting the first pair of opposing insulative walls to bound a tab receiving space,
wherein a first insulative wall of the first pair of opposing insulative walls is separated from a second insulative wall of the first pair of opposing insulative walls in a first direction by a first distance;
a plurality of electrical contacts held within the insulative member; and
a conductive shell disposed around the insulative member so as to bound the tab receiving space and the plurality of electrical contacts, the conductive shell comprising:
a tab disposed over the third insulative wall and comprising a portion that is disposed in the tab receiving space and has a second width, in the first direction, that is greater than the first distance.

18. The electrical connector of claim 17, wherein the portion of the tab has the second width at least at a first point within the tab receiving space.

19. The electrical connector of claim 18, wherein the portion of the tab has a third width different from the second width at a second point within the tab receiving space.

20. The electrical connector of claim 17, wherein:
the third insulative wall has a tapered portion proximate an opening of the tab receiving space;
the portion of the tab is disposed over the tapered portion of the third insulative wall.

21. The electrical connector of claim 20, wherein:
the third insulative wall has a straight portion within the tab receiving space; and
the portion of the tab is further disposed along the straight portion of the third insulative wall.

22. The electrical connector of claim 17, wherein:
the portion of the tab comprises a first end and a second end spaced from the first end in the first direction by the second width,
the first end and second ends are disposed in the tab receiving space;
the first end is configured to press against the first insulative wall; and the second end is configured to press against the second insulative wall.

23. The electrical connector of claim 22, wherein:

the first end is recessed into the first insulative wall; and the second end is recessed into the second insulative wall.

24. The electrical connector of claim 17, wherein:

the tab is folded about a first axis; and the first direction is parallel to the first axis.

25. The electrical connector of claim 17, wherein:

the electrical connector is oriented to receive a mating electrical connector inserted in a mating direction perpendicular to the first direction;

the insulative member comprises a surface disposed at least partially around the tab receiving space and facing in a direction opposite the mating direction; and the tab is entirely offset from the surface of the insulative member in the mating direction.

* * * * *